US006328453B1

(12) United States Patent
Ohkawa

(10) Patent No.: US 6,328,453 B1
(45) Date of Patent: Dec. 11, 2001

(54) SURFACE LIGHT SOURCE DEVICE OF SIDE LIGHT TYPE AND LIGHT CONTROL ELEMENT

(75) Inventor: Shingo Ohkawa, Koshigaya (JP)

(73) Assignee: Enplas Corporation, Kawaguchi (JP)

( * ) Notice: Subject to any disclaimer, the term of this patent is extended or adjusted under 35 U.S.C. 154(b) by 0 days.

(21) Appl. No.: 09/033,239

(22) Filed: Mar. 3, 1998

(30) Foreign Application Priority Data

Mar. 14, 1997 (JP) ...................................... 9-082192
Mar. 27, 1997 (JP) ...................................... 9-093235

(51) Int. Cl.$^7$ ........................................................ F21V 7/04
(52) U.S. Cl. .............................. 362/31; 362/512; 362/26; 362/543
(58) Field of Search ........................ 362/31, 331, 26, 362/543, 512; 430/311, 5; 257/336

(56) References Cited

U.S. PATENT DOCUMENTS

| 5,400,224 | 3/1995 | DuNah et al. ................................ 362/31 |
| 5,575,549 | * 11/1996 | Ishikawa er al. .......................... 362/31 |
| 5,810,464 | * 9/1998 | Ishikawa et al. .......................... 362/31 |
| 5,833,344 | * 11/1998 | Arai et al. ................................ 362/31 |
| 6,086,211 | * 6/1998 | Ohkawa .................................. 362/31 |

FOREIGN PATENT DOCUMENTS 270978   2/1996   (CN) .

* cited by examiner

Primary Examiner—Sandra O'Shea
Assistant Examiner—Bertrand Zeade
(74) Attorney, Agent, or Firm—Staas & Halsey LLP

(57) ABSTRACT

A surface light source of side light type comprises a light scattering guide plate, primary light source, reflection sheet, and prism sheet acting as a light control member. An emission surface of the light guide plate provides a light control surface (arrow C). This light control surface has a great number of fine projections running approximately perpendicular or inclined at a small angle to an incidence surface. A pair of slopes are formed on each of the projections. A prism sheet has a light control surface opposing the light control plate (arrow B). The projections on the prism sheet extend approximately parallel to the incidence surface. An inclination angle of a slope may be selected so that an emission light from the light guide plate is received at a small incidence angle. An inclination angle of a slope may be selected so that an emission light from the prism sheet to the frontal direction can be obtained. A back surface of the light guide plate may provide a light control surface.

32 Claims, 24 Drawing Sheets

10: SURFACE LIGHT SOURCE DEVICE OF SIDE LIGHT TYPE

10: SURFACE LIGHT SOURCE DEVICE OF SIDE LIGHT TYPE

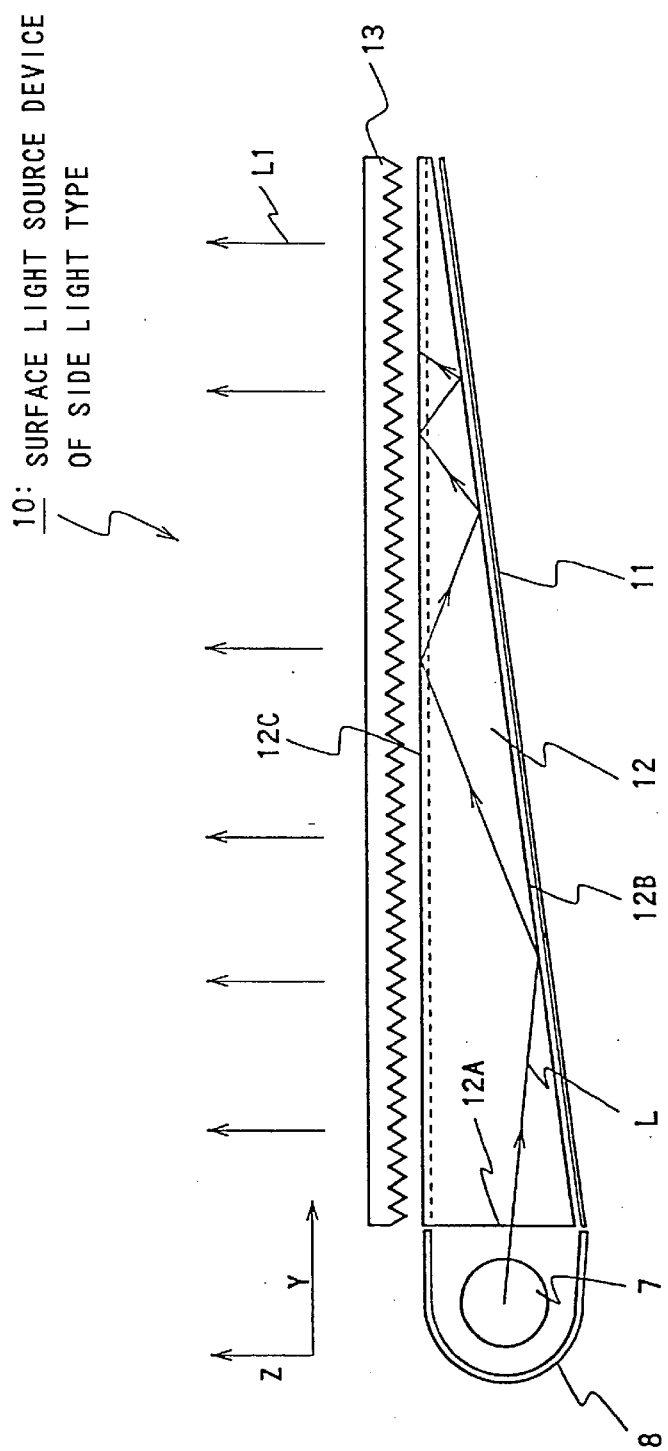

10: SURFACE LIGHT SOURCE DEVICE OF SIDE LIGHT TYPE

1: SURFACE LIGHT SOURCE DEVICE OF SIDE LIGHT TYPE

SURFACE LIGHT SOURCE DEVICE OF SIDE LIGHT TYPE AND LIGHT CONTROL ELEMENT

BACKGROUND OF THE INVENTION

1. Field of the Invention

This invention relates to a surface light source device of side light type and a light control element for use therein. This invention is applied to for example, back lighting of a liquid crystal display apparatus.

2. Description of the Related Art

A surface light source device of side light type has been employed in, for example, a liquid crystal display apparatus. This device irradiates the liquid crystal display panel from its back. This disposition is suitable for thinning the entire shape of the apparatus.

In the surface light source device of side light type, ordinarily, a rod-like light source such as cold cathode tube is employed as a primary light source and disposed on a side of the light guide plate. Irradiation light emitted from the primary light source passes a side end face of the light guide plate so that it is introduced into the inside of the light guide plate. The introduced irradiation light is transmitted inside of the light guide plate. In that process, light emission occurs from a major surface of the light guide plate toward a liquid crystal display panel.

As the light guide plate employed in such a surface light source device of side light type, a type having approximately equal plate thickness and another type in which the plate thickness decreases as it goes far from the primary light source have been well known. Generally, the latter emits irradiation light more effectively than the former.

FIG. 21 is a disassembly perspective view showing the surface light source device of side light type using the light guide plate of the latter. FIG. 22 shows a section along the line A—A of FIG. 21. Referring to FIGS. 21, 22, the surface light source device of side light type 1 comprise a light guide plate 2, a primary light source 3 disposed on a side thereof, a reflection sheet 4, a light diffusing sheet H, and prism sheets 5, 6 acting as a light control member. The reflection sheet 4, light guide plate 2, light diffusing sheet H and prism sheets 5, 6 are laminatedly arranged.

The light guide plate 2 is a transparent light guide plate or light scattering guide plate having a wedge-shaped section. The former is a light guide plate made of, for example, transparent acrylic resin and usually a light scattering surface is formed on the back surface 2B. The latter is a light guide plate made of light scattering substance. The light scattering substance is composed of, for example, matrix made of poly methyl methacrylate (PMMA) and a great number of light transmissive fine particles uniformly diffused therein. Refractive index of these particles is different from that of the matrix.

The primary light source 3 has a cold cathode tube (fluorescent lamp) 7 and a reflector 8 which is disposed on the back having an approximately semi-circular section. The irradiation light is supplied through an opening of the reflector 8 toward a side end face of the light guide plate 2. The reflection sheet 4 is made of sheet-like regular reflection member made of metallic foil or the like or sheet-like irregular reflection member made of white PET film.

The irradiation light L from the primary light source 3 is introduced into the light guide plate 2 through the incidence surface 2A which is a side end face of the light guide plate 2. The reflection light L is repeatedly reflected between the back surface 2B on which the reflection sheet 4 is laid and the emission surface 2C and then transmitted toward a distal end thereof. In this while, the irradiation light L is subjected to scattering action by the back surface having light scattering property and fine particles inside of the light guide plate 2. If the reflection sheet 4 made of irregular reflection member is employed, the irradiation light is also subjected to irregular reflection action.

Each time when the irradiation light L is reflected by the slope 2B, the incidence angle relative to the emission surface 2C gradually decreases. The decrease of the incidence angle increases component having a smaller angle than the critical angle relative to the emission surface thereby inducing emission from the emission surface. As a result, shortage of the emission light in a region far from the primary light source 3 is prevented.

Because the irradiation light emitted from the emission surface 2C has experienced scattering of light by the back surface 2B having the light scattering property and light guiding fine particles, and irregular reflection by the reflection sheet 4, it has a characteristic of the scattered light. However, main propagation direction of the irradiation light emitted from the light guide plate 2 is inclined toward the distal end direction (opposite direction to the primary light source 3) relative to the frontal direction. That is, the emission light of the light guide plate 2 has directivity. Such a characteristic of the light guide plate is called emission directivity.

The prism sheets 5, 6 are disposed to correct the emission directivity of the light guide plate 2. The light diffusing sheet H is disposed as required, to prevent the light scattering surface of the back surface 2B from being noticed from above the light emission surface 2C by scattering the irradiation light emitted from the light guide plate 2 and further to suppress local highlighting, shading and the like of the light guide plate 2. If the light guide plate 2 is a light scattering guide plate, often the light diffusing sheet H is omitted.

The prism sheets 5, 6 are formed of transmissive sheet-like members of polycarbonate or the like. The prism surface is formed on an opposite side to a surface (outside surface) opposing the light guide plate 2. The prism surface has a great number of projections which extend approximately parallel in a single direction and have a triangle section. In the inside prism sheet 5, its projections are oriented so as to run parallel to the incidence surface 2A. The outside prism sheet 6 is oriented so that the projections extend approximately perpendicular to the incidence surface 2A.

The slopes of these projections correct main emission direction of the emission light to the frontal direction of the emission surface 2C. A double-sided prism sheet having each prism surface on both sides may be used.

Generally, as compared with the surface light source device of side light type in which an approximately equal thickness light guide plate is employed, the surface light source device of side light type employing such a wedge-shaped light guide plate and a prism sheet is capable of emitting the emission light more effectively to the frontal direction.

OBJECT AND SUMMARY OF THE INVENTION

An object of the present invention is to provide a surface light source device of side light type generating high quality irradiation light at an improved efficiency. Another object of the invention is to provide a novel light control member which is advantageously applicable to the surface light source device of side light type.

The present invention is applied to a surface light source device of side light type comprising: a light guide plate having two major surfaces providing an emission surface and a back surface; a primary light source for supplying irradiation light from an end face of the light guide plate; and a light control member which is disposed along the emission surface for correcting directivity of the irradiation light emitted from the emission surface.

According to the present invention, at least one of the two major surfaces provides a first light control surface in which projections running approximately perpendicular to the end face are repeatedly disposed, and a surface, facing the light guide plate, of the light control member provides a second light control surface in which projections running approximately parallel to the end face are repeatedly disposed. The first light control surface may be provided by an emission surface of the light control plate or the back surface.

The projections of the first light control surface and second light control surface are, preferably arranged at repetition pitch of less than 100 μm, particularly preferably less than 50 μm. This makes it difficult for the repeated arrangement of the projections to be visually noticed and prevents a fine pulsation of brightness due to the repeated arrangement. Further, moire fringes which might be generated by a relation with the repetition pitch of the liquid crystal cell structure is reduced.

A pair of slopes formed on each projection of the second light control surface provides a first slope relatively near the end face and a second slope relatively far from the end face. An inclination angle of the first slope relative to the normal set on a general plane (a plane representing an running direction of the light guide plate) of the light guide plate may be smaller than the inclination angle of the second slope relative to the normal. This is advantageous for equalizing brightness on the emission surface of the control member.

It is preferable that the inclination angle of the first slope of the second light control surface is set so as to introduce main irradiation light emitted from the emission surface to the second slope and the inclination angle of the second slope is set so as to totally reflect the irradiation light arriving from the first slope to be directed in the direction of the normal.

It may be designed so that the running direction of the projection of the second light control surface is inclined by a small angle not exceeding 10° relative to the end face and the direction of repeated arrangement of the projection of the first light control surface is inclined by a small angle not exceeding 10° relative to the running direction of the projection of the second light control surface. This is advantageous for reducing moire fringes which might be generated by a relation with the repetition pitch of the liquid crystal cell structure.

It may be designed so that while the running direction of the projection of the second light control surface is inclined by a small angle not exceeding 10° relative to the end face, the running direction of the projection of the first light control surface is perpendicular to the running direction of the projection of the second light control surface.

Typically, the prism vertical angle of the first light control surface is in a range of 50° to 130°.

When the emission surface of the light guide plate provides a first light control surface, it is preferable that a regular reflection layer for reflecting the irradiation light regularly is disposed on the back surface of the light guide plate, in order to prevent loss of light.

Further, the present invention provides a novel light control member having a light control surface. According to the present invention, The light control surface of the light control member has a great number of projections repeatedly arranged. Each of the projections extends in a direction inclined relative to an end face of the light control member and has a pair of slopes including a first slope and a second slope. The first slope and second slope are inclined relative to a general plane along the light control member.

The present invention will be described in detail with reference to the accompanying drawings.

BRIEF DESCRIPTION OF THE DRAWING

FIG. 2 is a sectional view taken along the line B—B of FIG. 1;

PREFERRED EMBODIMENTS (1) First Embodiment

Figure 1A:
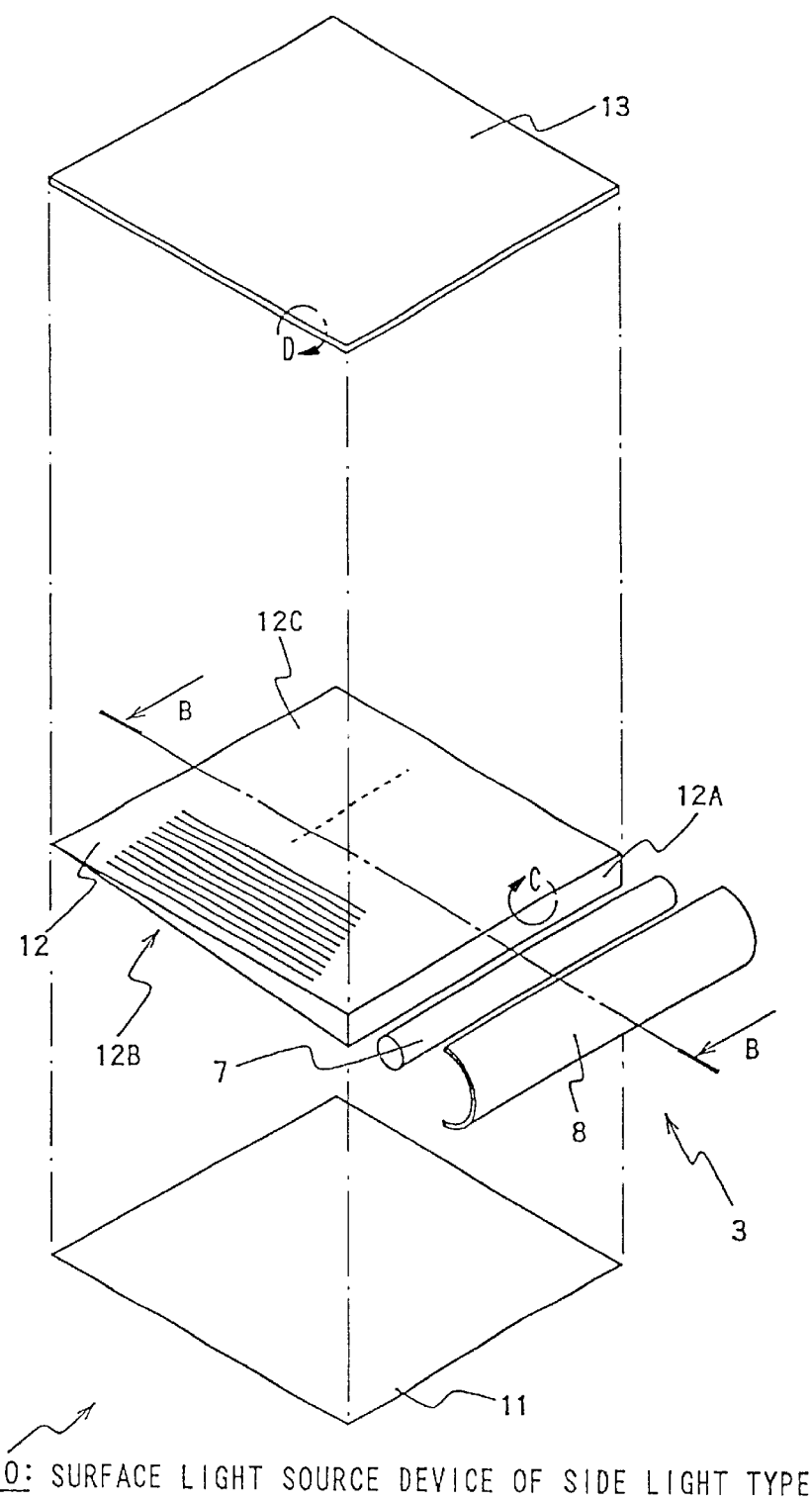
FIG. 1A is an exploded perspective view showing a surface light source of side light type according to the first embodiment of the present invention.
Figure 1B:
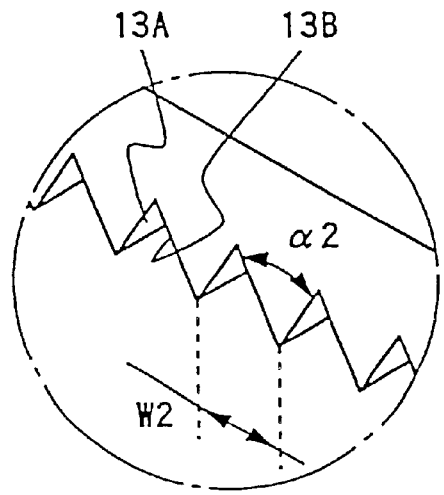
FIG. 1B is a partially enlarged view of a light control surface of a prism sheet, represented with arrow D in FIG. 1A.
Figure 1C:
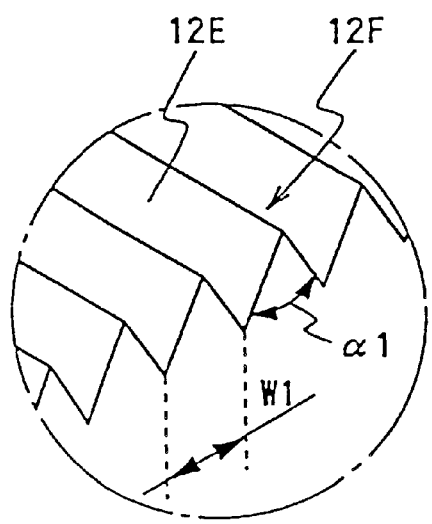
FIG. 1C is a partially enlarged view of a light control surface of a light scattering guide plate, represented with arrow C in FIG. 1A.

Referring to FIGS. 1 and 2, a surface light source device of side light type 10 comprises a light scattering guide plate 12, a primary light source 3, a reflection sheet 11 and a prism sheet 13 as a light control element. The reflection sheet 11, light scattering guide plate 12 and prism sheet 13 are laminatedly arranged. A regular reflection member on which silver is evaporated is used as the reflection sheet 11 to provide a high reflectivity for irradiation light. The reflection sheet 11 brings back irradiation light leaking from a back surface 12B of the light scattering guide plate 12 to inside of the light scattering guide plate 12 effectively so as to prevent loss of the irradiation light.

The light scattering guide plate 12 is a guide plate made of light scattering guide substance. The light scattering guide substance is composed of matrix made of, for example, poly methyl methacrylate (PMMA) and a great number of transmissive fine particles dispersed therein. Reflectivity of these fine particles is different from that of matrix. Hereinafter, the light scattering guide plate 12 may be called "light guide plate 12".

The irradiation light L introduced from an incidence surface (end surface) 12A of the light scattering guide plate 12 is scattered by the fine particles so that it is reflected repeatedly between the back surface 12B and an emission surface 12C and transmitted. In this process, the irradiation light L emits at a rate from the emission surface 12C.

The emission surface 12C of the light scattering guide plate 12 provides a light control surface as shown by partial enlargement with an arrow C. This light control surface has a great number of fine projections running approximately perpendicular to the incidence surface 12A. Each of the projections has a pair of slopes 12E, 12F.

Figure 3:
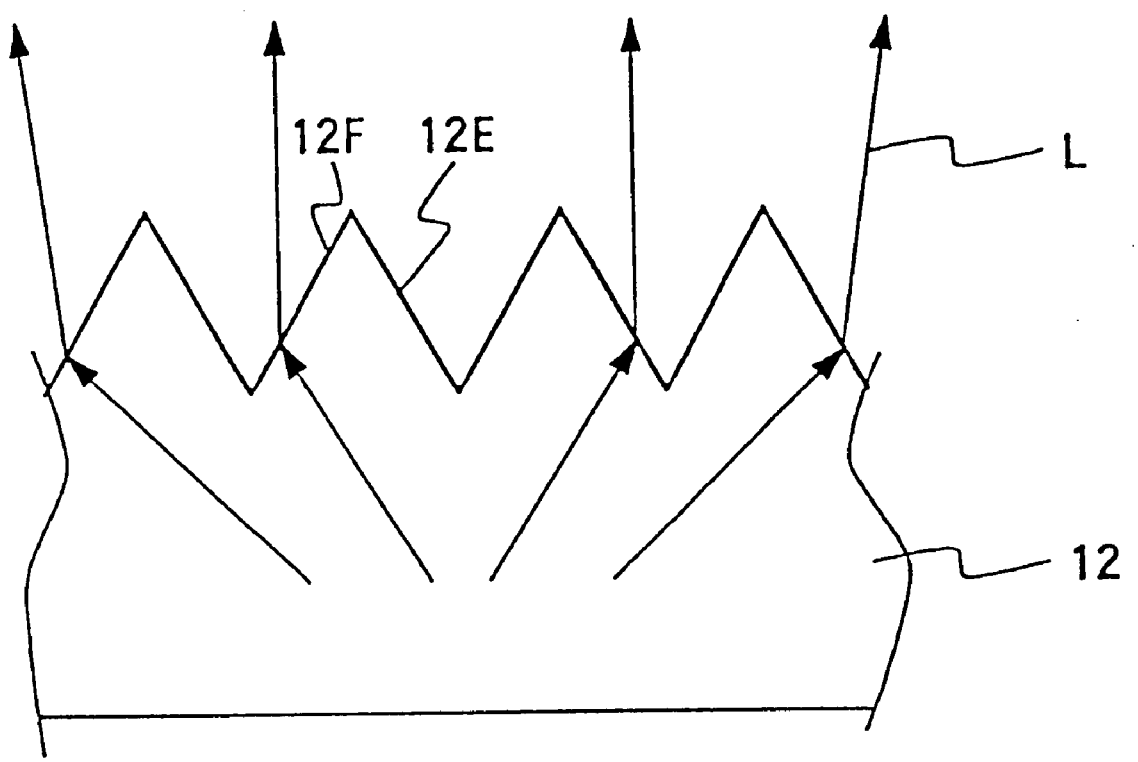
FIG. 3 is a sectional view showing an emission surface of a light scattering guide plate of FIG. 1 in detail.

According to the present embodiment, the pair of the slopes 12E, 12F are directly joined with each other so that each projection has a triangle section. As shown in FIG. 3, the light scattering guide plate 12 refracts irradiation light by these slopes 12E, 12F so as to correct directivity of emission light within a plane parallel to the incidence surface 12A to be directed toward the frontal direction of the emission surface 12C.

According to the present embodiment, the pair of the slopes 12E, 12F have an equal angle relative to the normal provided on a general plane of the light scattering guide plate 12. Its vertical angle α is, for example, about 60°. Generally, the vertical angle 60 1 of 50° to 130° is practical and preferably that angle is in a range of 60° to 110°.

The repeated pitch W1 of the fine projection is preferred to be less than 100 μm, particularly less than 50 μm. This value corresponds to ½ or less (100 μm or less), or ¼ or less (50 μm or less) of picture element cycle of the liquid crystal display panel the back of which is irradiated by the surface light source device of side light type 10, so as to prevent an occurrence of moire fringes and further an occurrence of cyclic brightness unevenness.

In the prism sheet 13, a prism surface acting as a light control surface opposing the light scattering guide plate 12 is formed. The prism surface is formed by hardening acrylic ultraviolet curing resin or the like in a predefined shape on a base made of for example transparent PET.

In the prism sheet 13, a surface opposing the emission surface 12C provides a prism surface as a light control surface as shown by partial enlargement with an arrow D. This prism surface has a great number of fine projections running approximately parallel to the incidence surface 12A. That is, the projections on the prism sheet 13 extend approximately perpendicular to the projections on the light scattering guide plate 12.

Each of the projections of the prism sheet 13 has a pair of slopes 13A, 13B. According to the present embodiment, the pair of the slopes 13A, 13B are directly joined with each other so that each projection has a triangle section.

Figure 4:
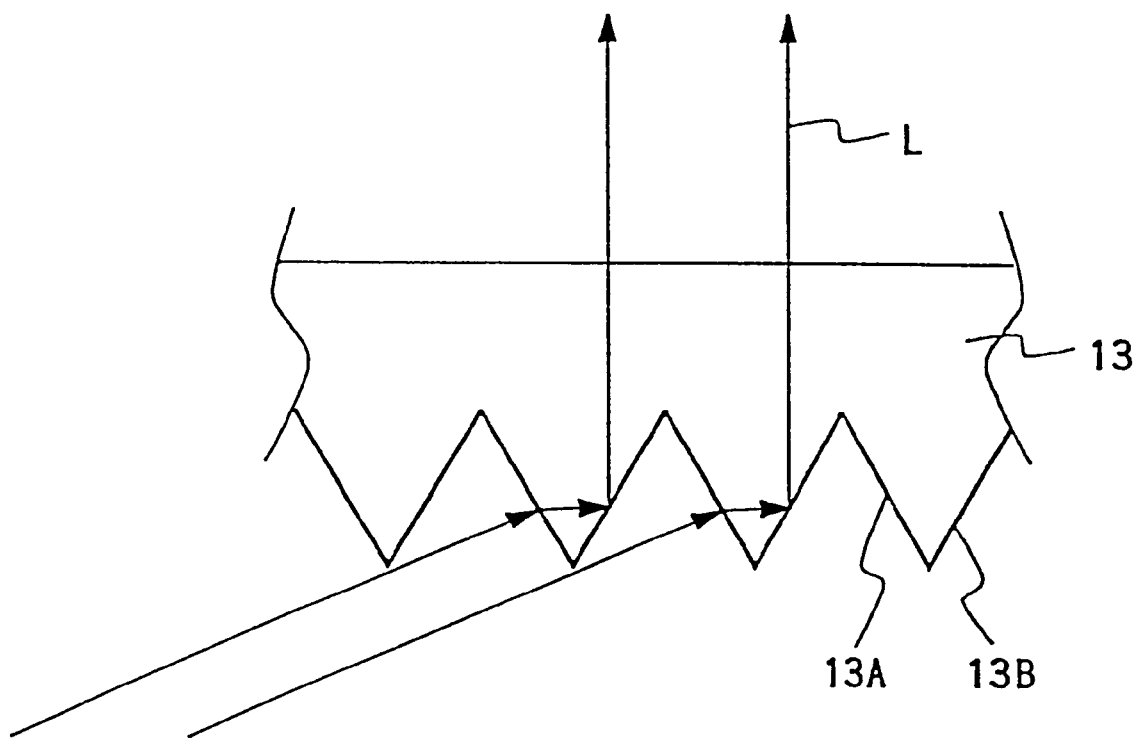
FIG. 4 is a sectional view showing a symmetrical prism sheet of FIG. 1 and FIG. 14 in detail.

As shown in FIG. 4, irradiation light L1 emitted from the light scattering guide plate 12 inclinedly toward the wedge distal end is introduced by the slope 13A which is relatively near the incidence surface 12A to the inside, and reflected by the slope 13B making a pair with the slope 13A so as to be directed toward the frontal direction of the emission surface 12C. Therefore, the prism sheet 13 corrects directivity of the emission light within a plane perpendicular to the incidence surface 12A, so as to be toward the frontal direction of the emission surface 12C.

According to the present embodiment, the pair of the slopes 13A, 13B form an equal angle relative to the normal set on a general plane of the light guide plate. Its vertical angle α1 is, for example, about 66°. Generally, the vertical angle α2 of 30° to 70° is practical and preferably that angle is 50° to 70°, particularly preferably in a range of 60° to 70°.

The repeated pitch W2 of the fine projection on the prism sheet 13 is preferred to be 100 μm or less, particularly 50 μm or less. This value corresponds to ½ or less (100 μm or less) or ¼ or less (50 μm or less) of picture element cycle of the liquid crystal display panel the back of which is irradiated by the surface light source device of side light type 10, so as to prevent an occurrence of moire fringes and further an occurrence of cyclic brightness unevenness.

The irradiation light L projected from a fluorescent lamp 7 is introduced into the inside of the light scattering guide plate 12 from the incidence surface 12A directly or after it is reflected by a reflector 8. The irradiation light is repeatedly reflected between the back surface 12B and emission surface 12C while dispersed by transparent fine particles and then transmitted within the inside of the light scattering guide plate 12.

Each time when reflected by the back surface 12B, an incidence angle with respect to the emission surface 12C decreases. Components smaller than critical angle relative to the emission surface 12C are emitted from the emission surface 12C. Irradiation light leaking from the back surface 12B is introduced back into the inside of the light scattering guide plate 12 effectively by the reflection sheet 11 so as to prevent loss.

Combined action of the prism surface of the emission surface 12C and prism surface of the prism sheet 13 will be considered here. For preparation for it, a distribution of irradiation light emitted from the light guide plate (light scattering guide plate) having an emission surface provided with no prism surface is shown in FIG. 5.

Figure 5:
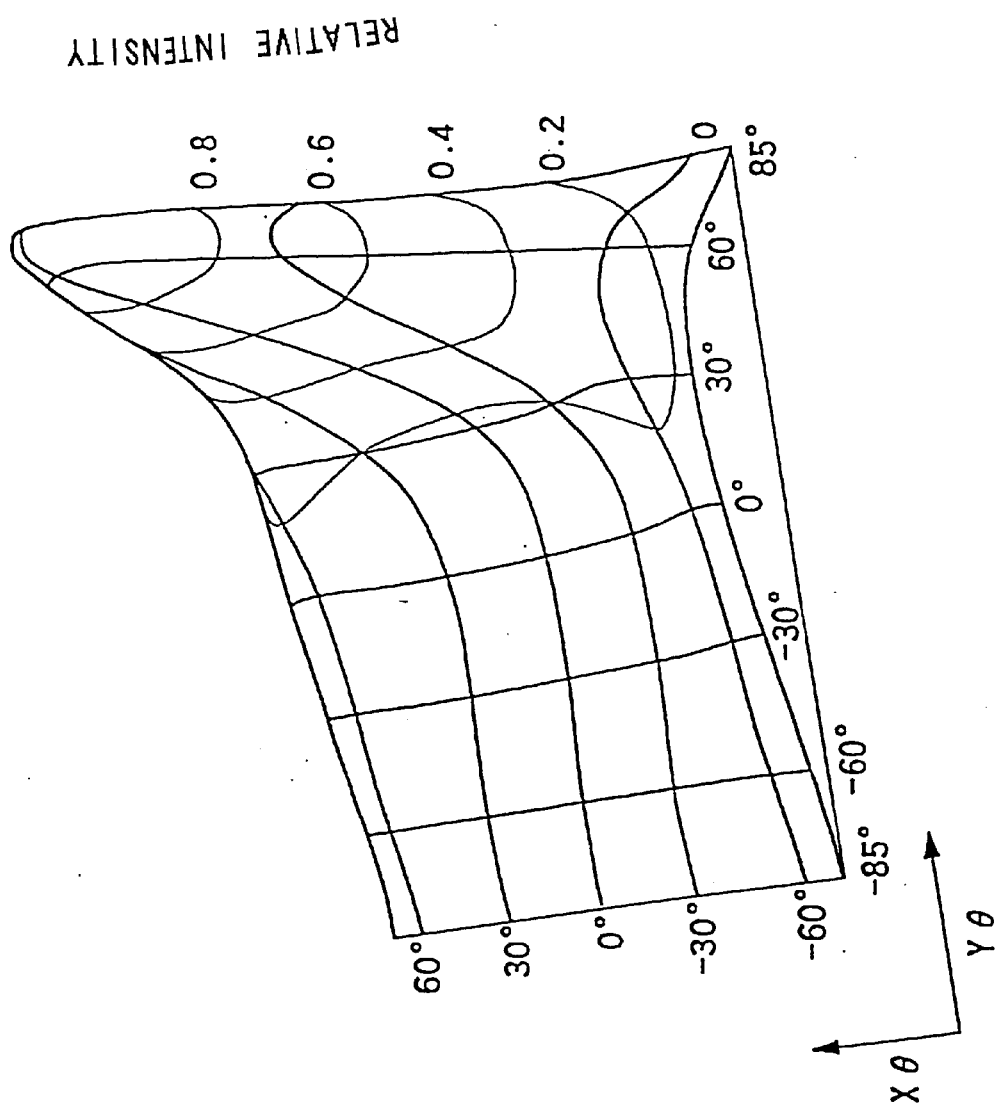
FIG. 5 is a graph showing a distribution of irradiation light emitted from a conventional light scattering guide plate for comparison with the surface light source device of FIG. 1.

In FIG. 5, Xθ indicates angle in a plane parallel to the incidence surface and Yθ indicates angle in a plane perpendicular to the incidence surface. The intensity of the irradiation light emitted in respective directions from the light guide plate is detected. These conditions are applied to FIGS. 6, 7, 8, 11, 12 17–20 which will be mentioned later.

As understood through FIG. 5, the distribution of the emission light is inclined toward the wedge distal end in a plane perpendicular to the incidence surface and then expanded to both sides in a plane parallel to the incidence surface.

Figure 6:
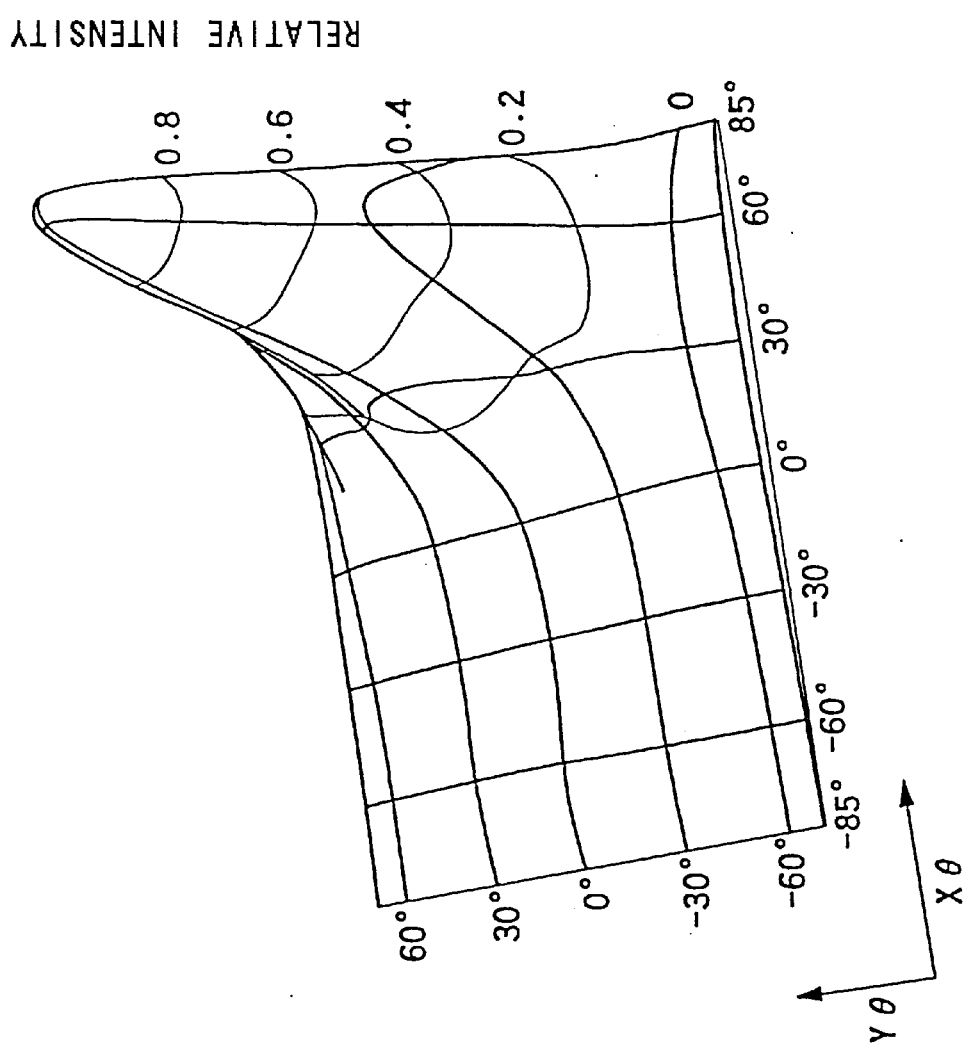
FIG. 6 is a graph showing a distribution of the irradiation light emitted from the light scattering guide plate of the surface light source device of FIG. 1.

FIG. 6 is a graph showing a distribution of the irradiation light emitted from the light scattering guide plate 12 according to the present embodiment. As understood through FIG. 6, although the distribution of the emission light is inclined toward the wedge distal end in a plane perpendicular to the incidence surface 12A, the expansion thereof to both sides is reduced in a plane parallel to the incidence surface 12A. That is, a great number of slopes 12E, 12F (see FIG. 3) on the emission surface 12C correct a tendency that the emission light is expanded to both sides, in a plane parallel to the incidence surface 12A. In this way, the irradiation light is introduced effectively to the frontal direction in the plane parallel to the incidence surface 12A.

By this directivity correction, directivity correction in a plane parallel to the incidence surface 12A is achieved without the prism sheet 6 (see FIGS. 21, 22) of the conventional structure.

Figure 7:
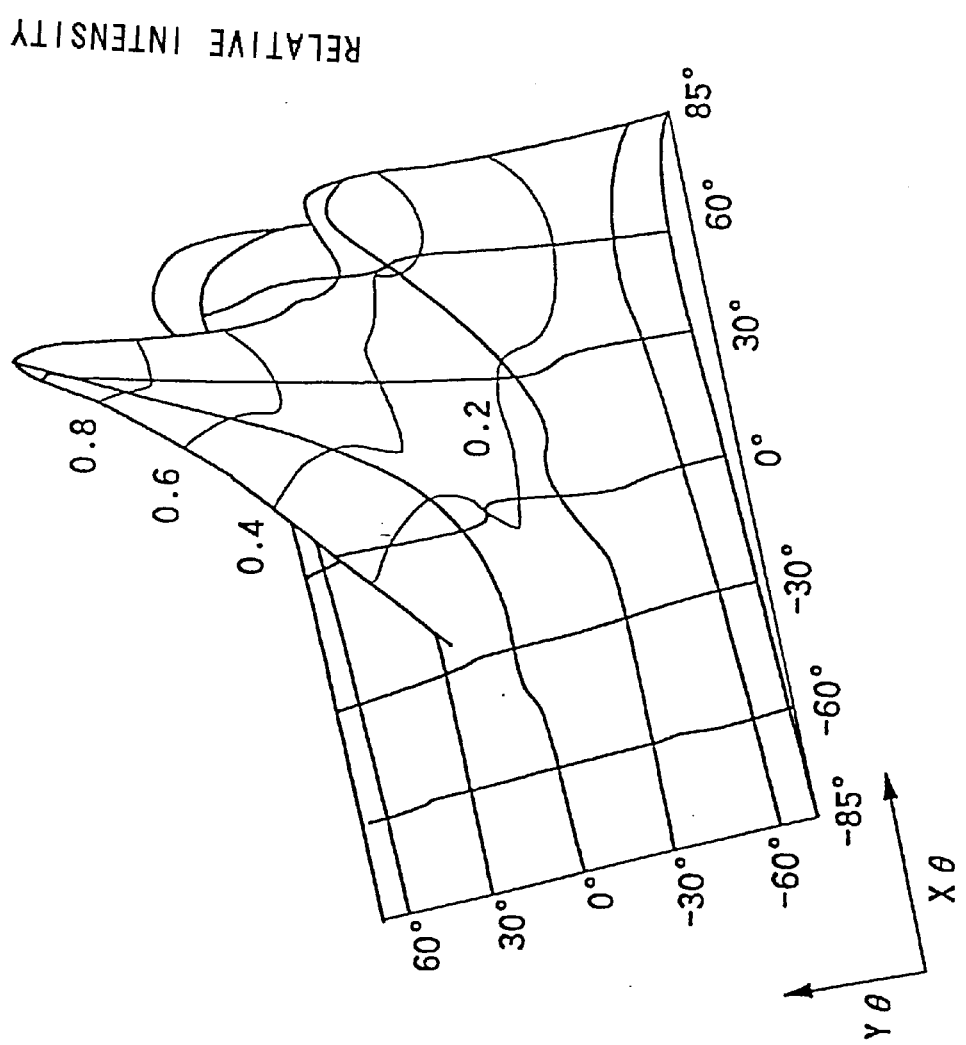
FIG. 7 is a graph showing a distribution of the irradiation light emitted from a light scattering guide plate of a conventional surface light source of side light type for comparison with FIG. 6.
Figure 21:
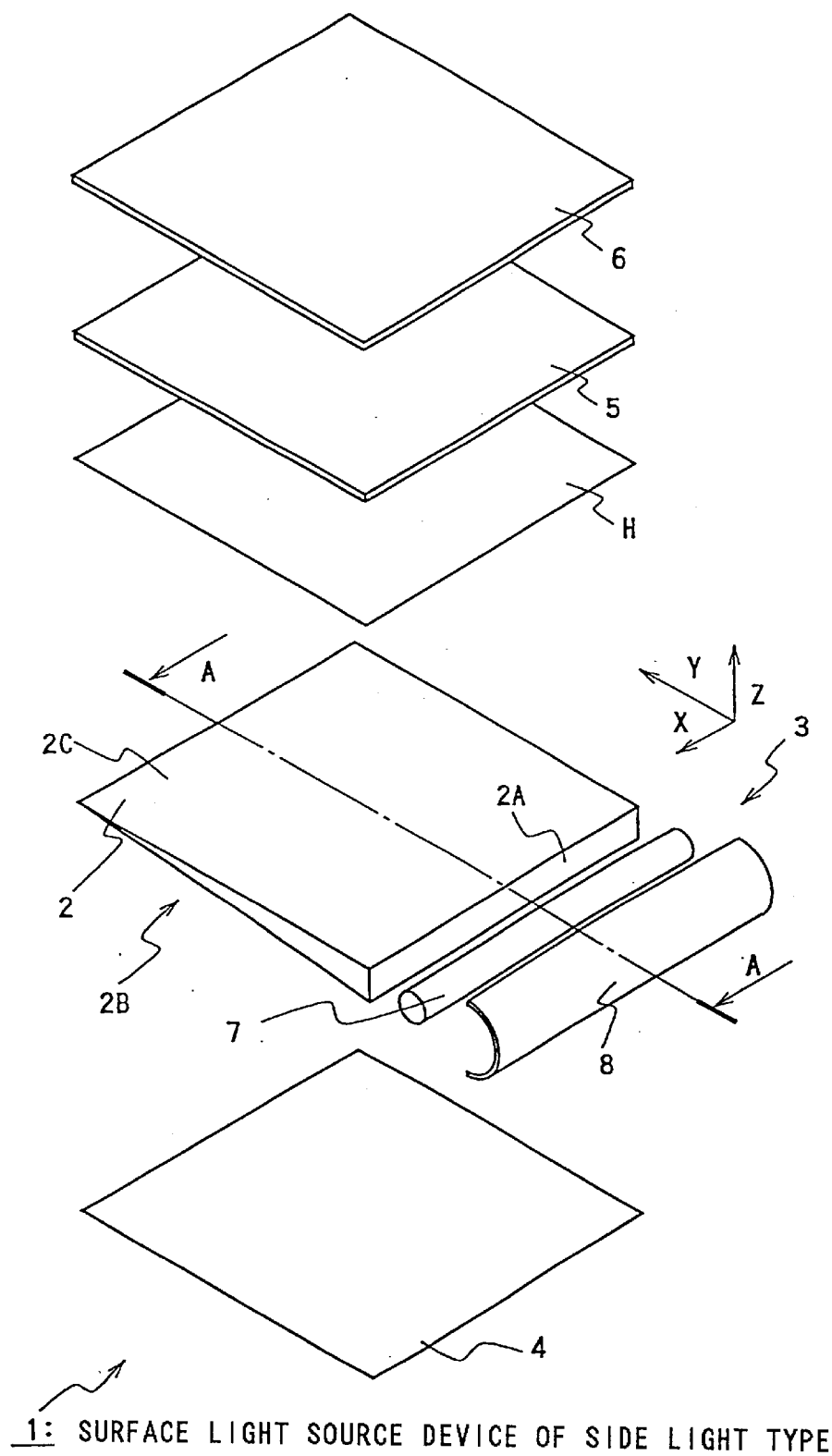
FIG. 21 is a disassembly perspective view showing a conventional surface light source of side light type.
Figure 22:
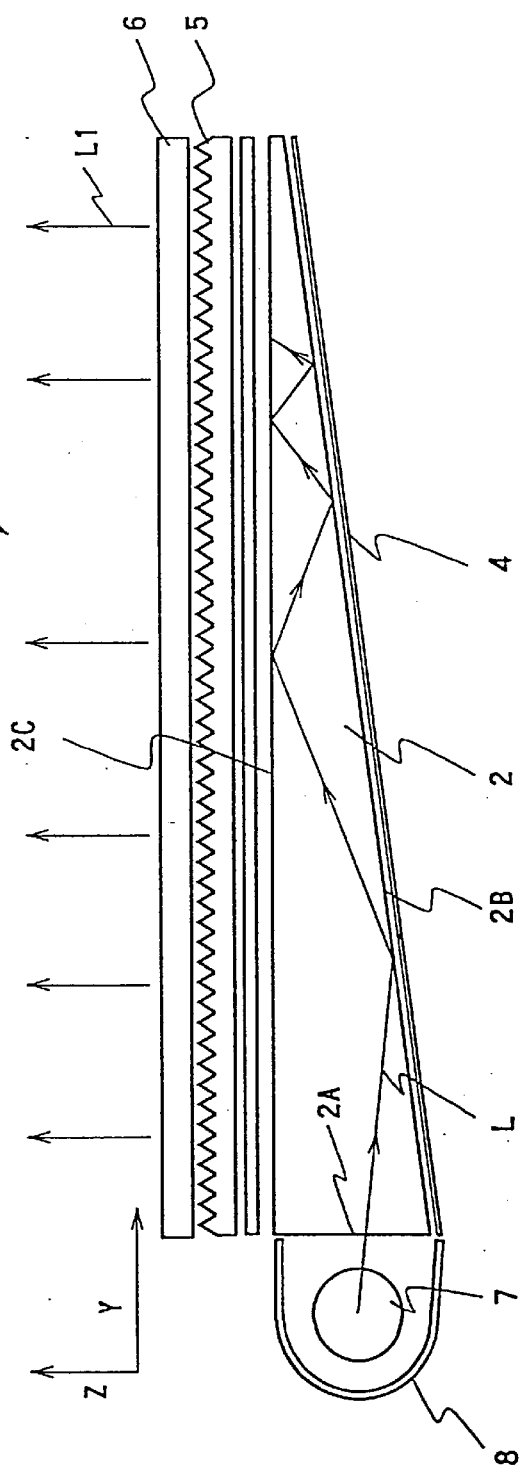
FIG. 22 is a sectional view taken along the line A—A of FIG. 21.

FIG. 7 is a graph showing a distribution of the irradiation light emitted from the light guide plate of the conventional surface light source device of side light type shown in FIGS. 21, 22 for comparison. Please note that the light scattering plate H is not used.

As understood through FIG. 7, a brightness peak occurs in other direction than the frontal direction of the emission surface 12C. This is estimated to be caused by a phenomenon that irradiation light components reflected by the incidence surface of the prism sheet 5 is emitted in other directions than the frontal direction of the emission surface 12C because of multiple reflections caused between the prism sheet 5 and light scattering guide plate 12.

According to the present embodiment, these components can be also introduced effectively toward the frontal direction of the emission surface 12C. Therefore, directivity is improved and availability of irradiation light is improved.

Figure 8:
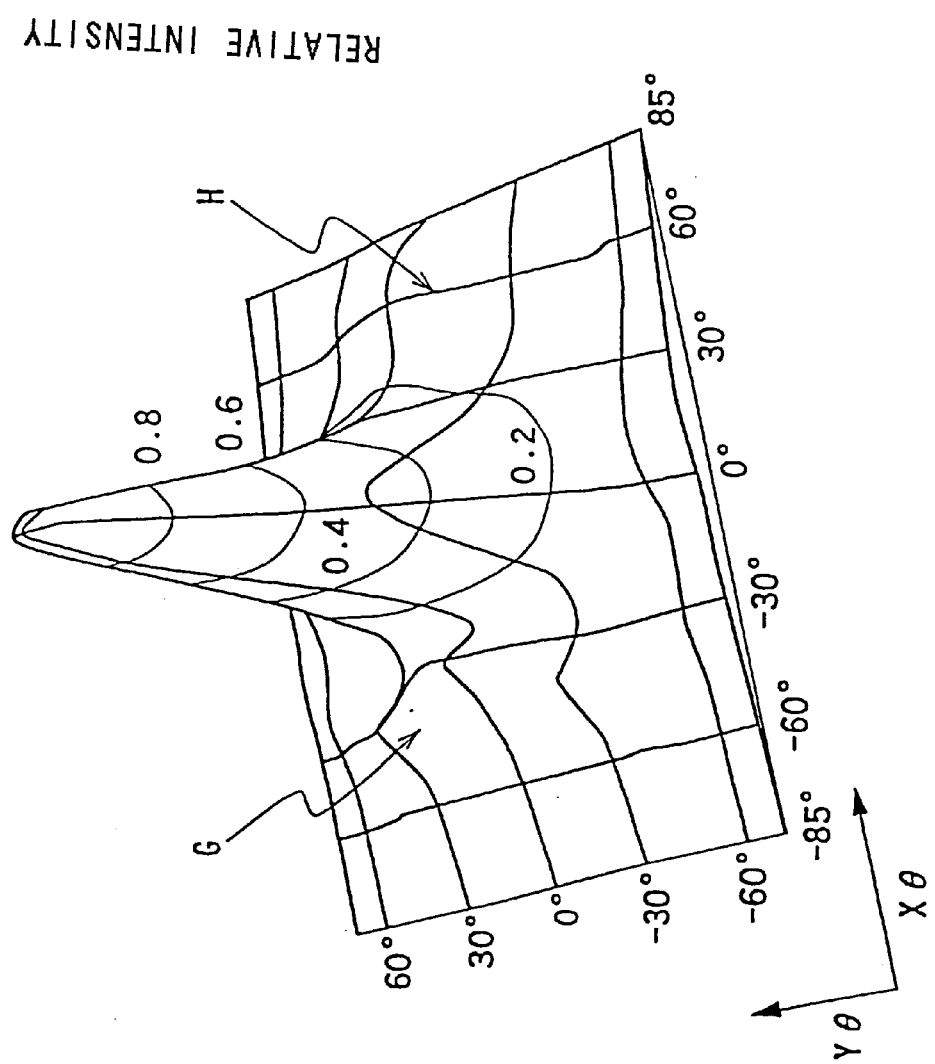
FIG. 8 is a graph showing a distribution of the irradiation light emitted from the prism sheet of FIG. 1.

The irradiation light emitted from the emission surface 12C passes the prism sheet 13, irradiating, for example, the liquid crystal display panel. As shown in FIG. 8, directivity of the irradiation light L is corrected so as to be toward the frontal direction by the slopes 13A, 13B parallel to the incidence surface 12A, in a plane perpendicular to the incidence surface 12A.

That is, the irradiation light L is introduced into the inside of the prism sheet 13 through the slope 13A relatively near the incidence surface 12A and then reflected by the slope 13B relatively far from the incidence surface 12A so that it is directed to an outside surface of the prism sheet 13.

What should be noticed is that because the irradiation lights L are gathered in the frontal direction in a plane parallel to the incidence surface 12A, as compared with the conventional device (see FIGS. 21, 22), reflection (particularly, total reflection) on the slope 13A is unlikely. This improves availability of the irradiation light and prevents appearance of the peak in other direction than the frontal direction.

Further, because a great number of the projections are formed on the emission surface 12C of the light scattering guide plate 12, adhesion of the prism sheet 13 to the light scattering guide plate 12 is effectively avoided.

(2) Second embodiment

Figure 9:
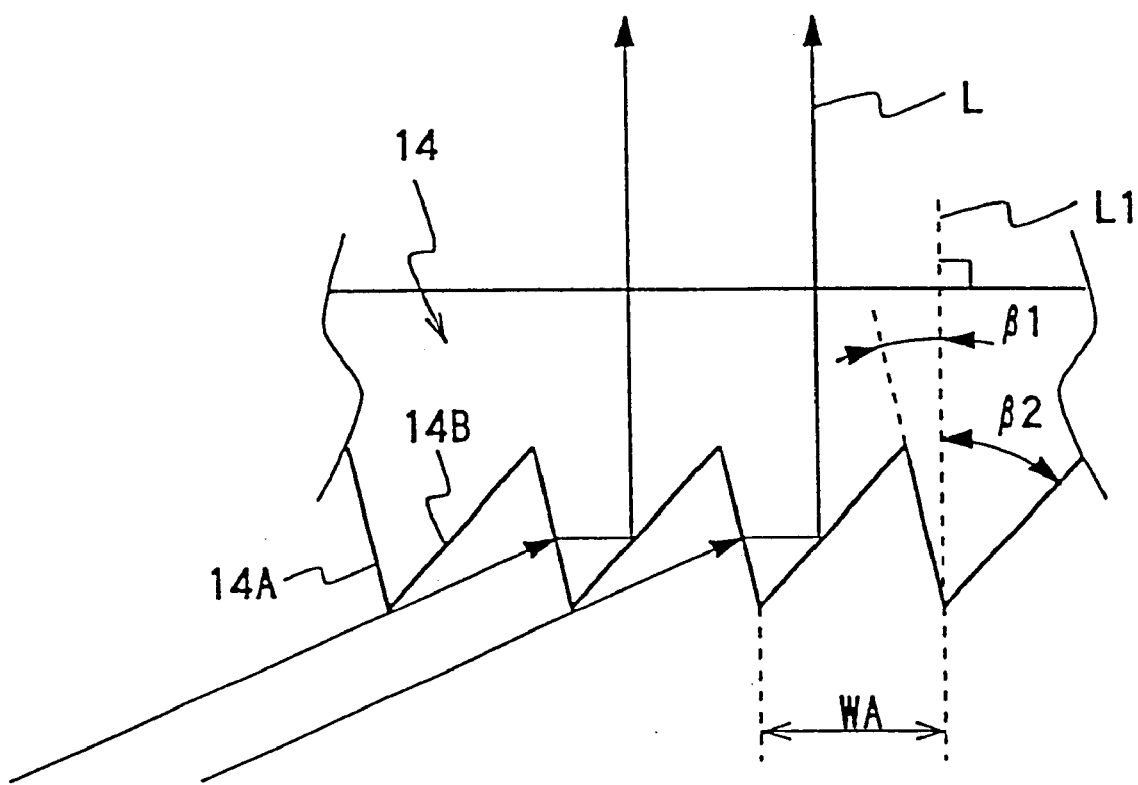
FIG. 9 is a sectional view for explaining an asymmetrical prism sheet.

The present embodiment has the common structure as the aforementioned first embodiment except that an asymmetrical prism sheet 14 shown in FIG. 9 is employed instead of the symmetrical prism sheet 13 (see FIGS. 1, 4). Therefore, repeated description of the common matter as the first embodiment will be simplified with reference to FIGS. 1, 2.

Like the first embodiment, the irradiation light L projected from a fluorescent lamp 7 is introduced into the inside of the light scattering guide plate 12 from the incidence surface 12A directly or after it is reflected by a reflector 8. The irradiation light is repeatedly reflected between the back surface 12B and emission surface 12C while dispersed by transmissive fine particles and then transmitted within the inside of the light scattering guide plate 12.

Each time when reflected by the back surface 12B, an incidence angle with respect to the emission surface 12C decreases. Components smaller than critical angle relative to the emission surface 12C are emitted from the emission surface 12C. Irradiation light leaking from the back surface 12B is introduced back into the inside of the light scattering guide plate 12 effectively by the reflection sheet 11 so as to prevent loss.

As described above, by an action of the prism surface (slopes 12E, 12F) formed on the emission surface 12C as a light control surface, the emission light from the light scattering guide plate 12 is gathered in the frontal direction, in a plane parallel to the incidence surface 12A.

The irradiation light L emitted from the light scattering guide plate 12 passes the prism sheet 14 shown in FIG. 9, thereby irradiating, for example, the liquid crystal display panel. Directivity of the irradiation light L is corrected to be in the frontal direction by the slopes 13A, 13B parallel to the incidence surface 12A, in a plane perpendicular to the incidence surface 12A.

The prism sheet 14 has common structure and orientation to the prism sheet 13 except that the slopes 14A, 14B have different inclinations. The projections each having the slopes 14A, 14B extend in a direction approximately parallel to the incidence surface 12A.

Referring to FIG. 9, an angle formed by the slope 14A relative to the normal set on a general plane of the light scattering guide plate 12 is expressed as $\beta 1$ and an angle formed by the slope 14B is expressed as $\beta 2$. The $\beta 1$ is smaller than the $\beta 2$. The $\beta 1$, $\beta 2$ are defined so that (i) main irradiation light emitted from the light scattering guide plate 12 with an inclination to the wedge distal end impinges upon the slope 14A which is relatively near the incidence surface 12A at a small incidence angle and is introduced to the slope 14B without waste, and (ii) it is totally reflected by the slope 14B thereby being directed to approximately frontal direction.

As shown in a graph of FIG. 6, the irradiation light emitted from the light scattering guide plate 12 has a main irradiation direction in a direction inclined at 70° relative to the wedge distal end. The expansion thereof in terms of angle is in a range of 20° to 85°.

According to these data, the angles $\beta 1$, $\beta 2$ and refractive index of the prism sheet 14 are designed so that the irradiation light is emitted from the prism sheet 14 approximately to the frontal direction. A preferred combination is $\beta 1 = 5.5°$, $\beta 2 = 35°$.

If the slopes 13A, 13B are provided with an equal inclination each like the first embodiment as shown in FIG.

10, there is a tendency that the irradiation light is totally reflected by the slope 13A which is relatively near the incidence surface 12A, so that irradiation light component LA which is to be returned to the light scattering guide plate 12 occurs. Further, a component LB which is not totally reflected by the slope 13B after introduced into the prism sheet 13 and emitted directly from the prism sheet 13 also is produced. Further, other component which is reflected plural times by the projections formed repeatedly is also produced.

It is estimated that by such a phenomenon, a peak like so-called side lobe is produced in main emission direction as shown by arrows G, H in FIG. 8.

Figure 11:
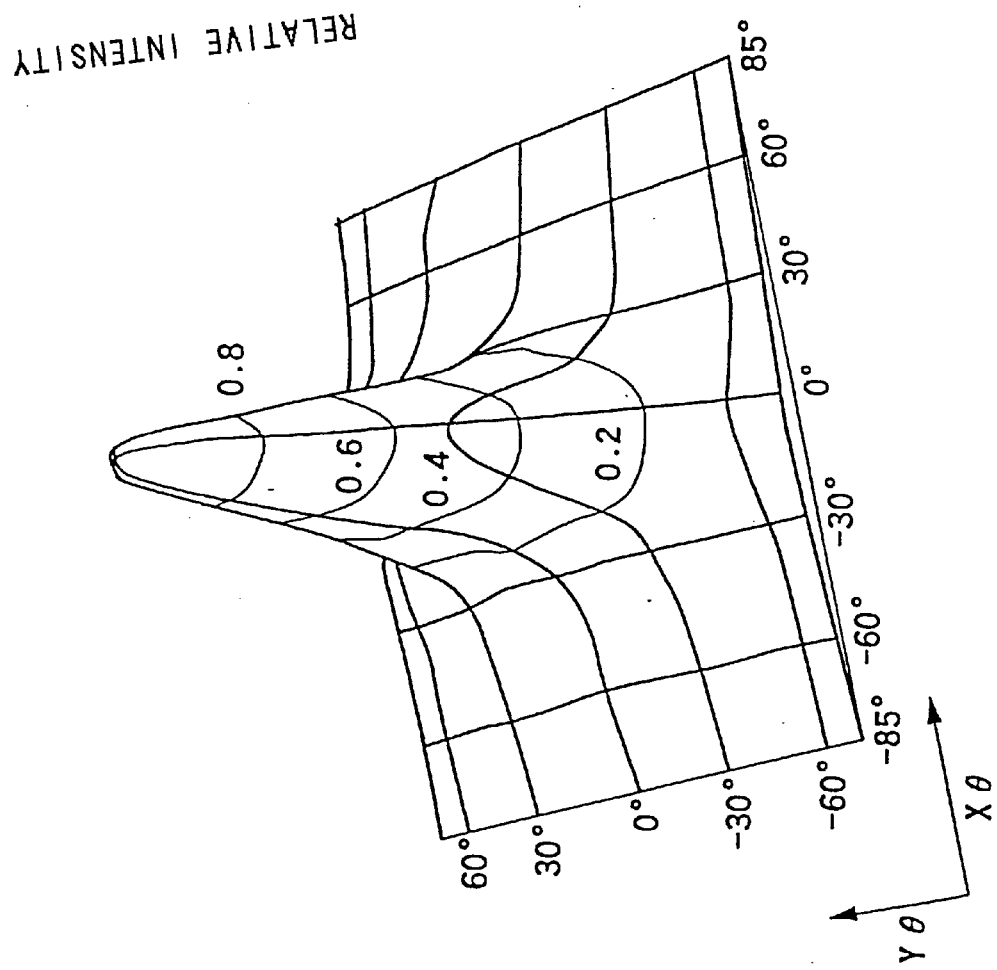
FIG. 11 is a graph showing directivity of the surface light source device using the prism sheet of FIG. 9.

To solve this problem, according to the present invention, a undesired peak is suppressed by setting $\beta1<\beta2$ ($\beta1$ is a small angle). FIG. 11 is a graph indicating directivity under $\beta1=5.5°$, $\beta2=35°$.

Figure 10:
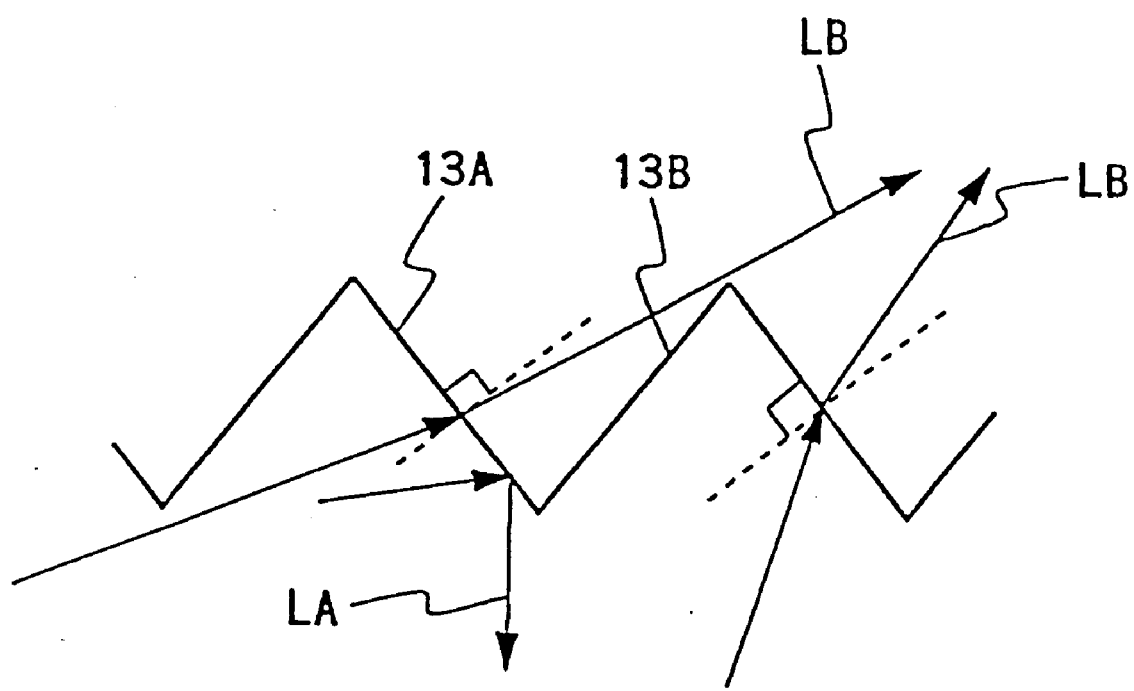
FIG. 10 is a sectional view showing a light path of the irradiation light in the symmetrical prism sheet for comparison with FIG. 9.

As understood through FIG. 11, according to the present embodiment, the irradiation light component emitted much inclinedly and directly from the prism sheet like the component LB of FIG. 10 is suppressed.

An action of gathering the irradiation light effectively to the frontal direction in terms of two dimensions is enhanced by a combination of the prism sheet and the prism surface on the light scattering guide plate 12.

Figure 12:
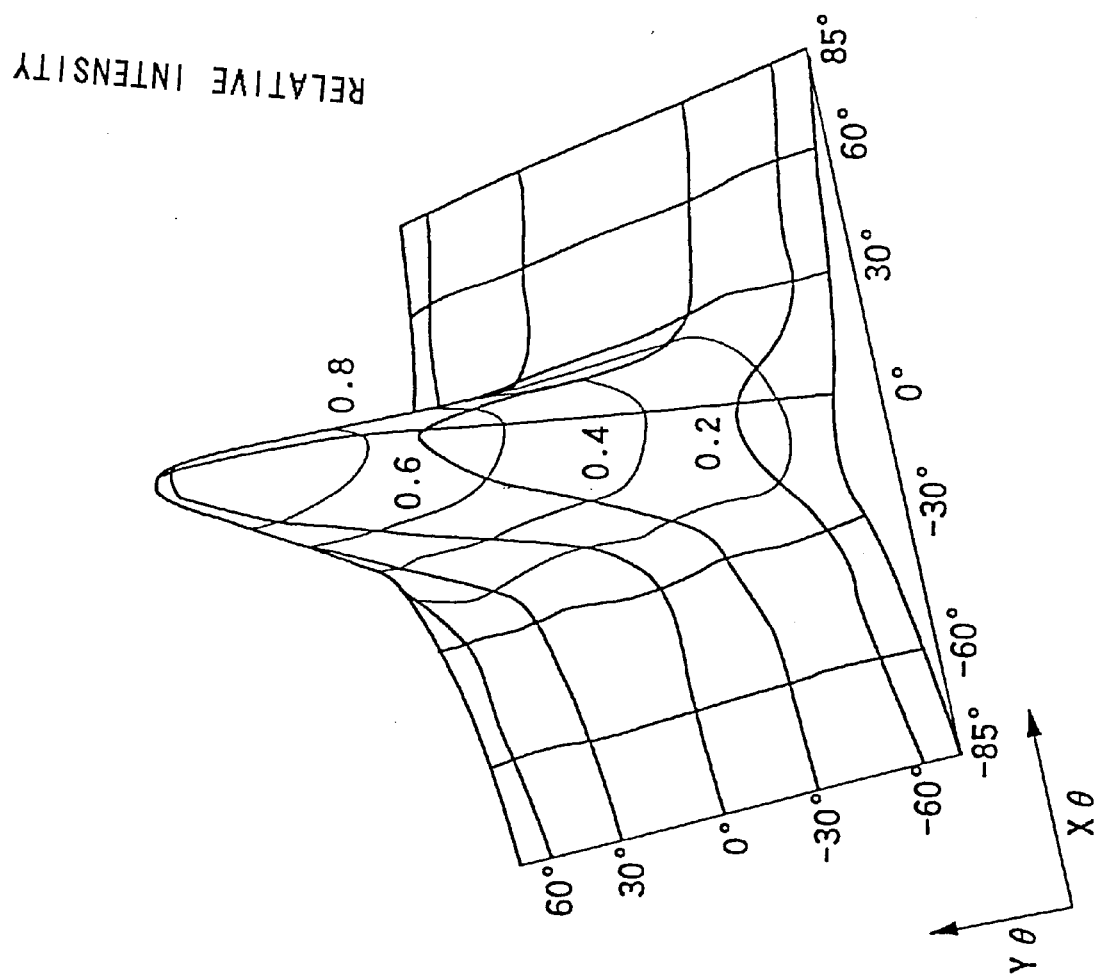
FIG. 12 is a graph showing directivity when the prism sheet of FIG. 9 is applied to a conventional light scattering guide plate of FIG. 9, for comparison with FIG. 11.

FIG. 12 is a graph indicating directivity when the light scattering guide plate 12 is exchanged with a light guide plate having no prism surface in order to show the above phenomenon. According to comparison of FIG. 11 with FIG. 12, the action of the combination of the prism sheet and a prism surface on the light scattering guide plate 12 will be understood.

What should be noticed here is that in the asymmetrical prism sheet as shown in FIG. 9, when observed from the outside (liquid crystal display panel side), the slope 14B looks wider than the slope 14A. On the contrary, in the symmetrical prism sheet shown in FIG. 4, when observed from the outside (liquid crystal display panel side), the slope 13B looks to have the same area as the slope 13A.

Therefore, according to the second embodiment, as compared with the first embodiment, fine pulsation emission intensity caused by repetition of fine projection on the prism sheet 14 is reduced so as to suppress effectively generation of moire fringes. Needless to say, if the repeated formation pitch of the projection on the prism surface of the light scattering guide plate 12 and prism sheet 14 is set to 100 μm or less, particularly 50 μm or less, this effect is more remarkable.

(3) Third embodiment

Figure 13:
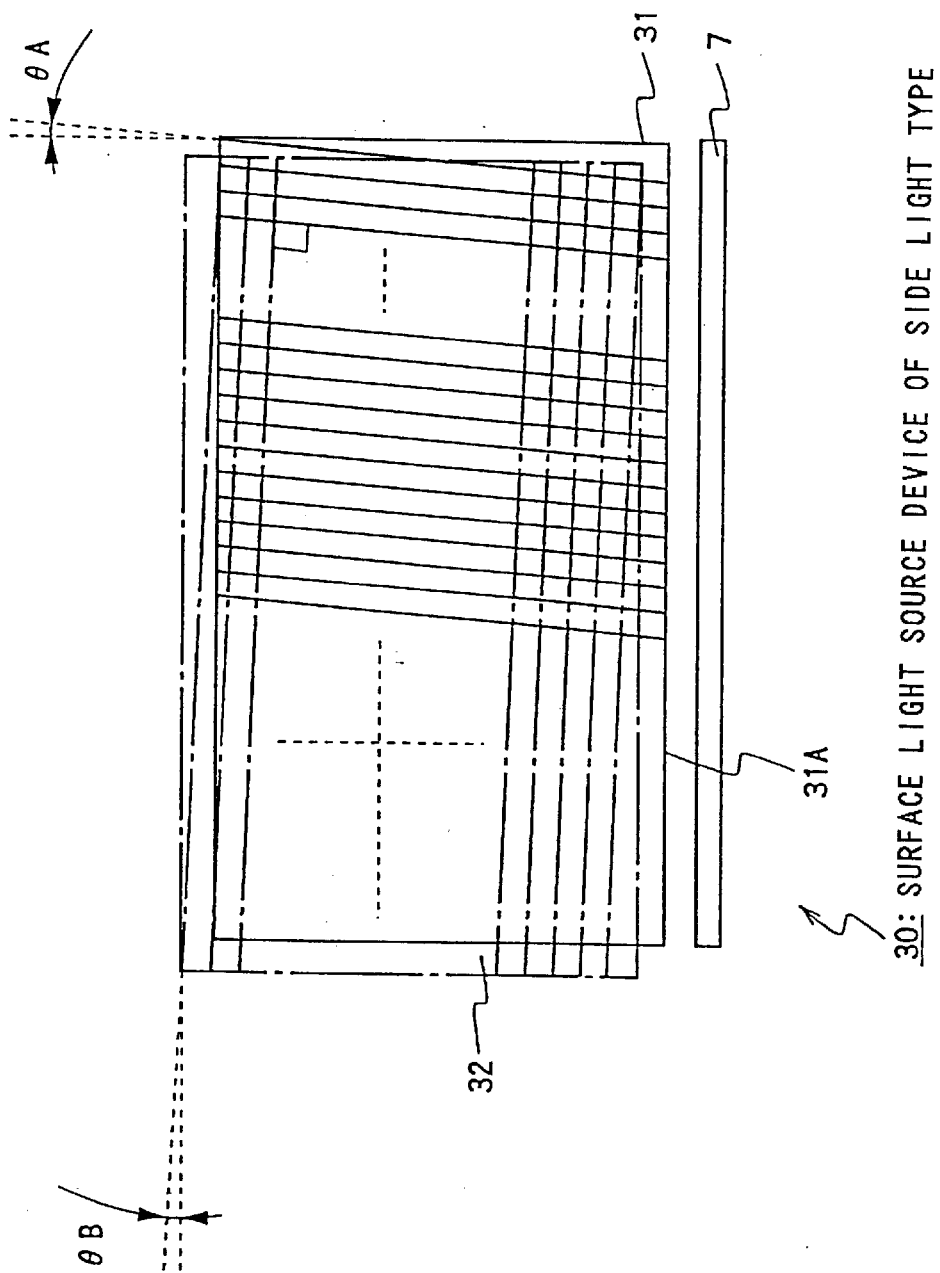
FIG. 13 is a top view for indicating the surface light source of side light type according to the third embodiment and sixth embodiment of the present invention as well as explaining the seventh embodiment.

FIG. 13 is a top view showing a surface light source device of side light type according to the present embodiment. The present embodiment has a common structure to the aforementioned first and second embodiments except that the extension direction of the projections providing a prism surface formed on the emission surface of the light guide plate is different from those of the first and second embodiments. Therefore, a repeated description of the common matter to the first and second embodiments will be omitted as possible.

Referring to FIG. 13, the irradiation light emitted from the fluorescent lamp 7 is introduced into the inside of a light guide plate 31 through an incidence surface 31A directly or after reflected by the reflector 8. The irradiation light is repeatedly reflected between the back surface and emission surface while dispersed by transmissive fine particles and then transmitted in the inside of the light guide plate.

Each time when reflected by the back surface, an incidence angle with respect to the emission surface decreases. Components smaller than critical angle relative to the emission surface are emitted from the emission surface. Irradiation light leaking from the back surface is introduced back into the inside of the light guide plate effectively by the reflection sheet (not shown) so as to prevent loss. The irradiation light emitted from the light guide plate 31 is emitted through the prism sheet 32 approximately to the frontal direction, thereby irradiating, for example, the liquid crystal display panel. The prism sheet 32 may be either symmetrical type (see FIG. 4) or asymmetrical type (see FIG. 9).

A prism surface is formed on the emission surface of the light guide plate 31. The prism surface is formed by repeated arrangement of the projection having a triangle section. A feature of the present embodiment is that the running direction of this projection is intentionally inclined at an angle θA relative to a direction perpendicular to the incidence surface 31A.

The prism surface of the prism sheet 32, opposing the light guide plate 31 contains a great number of fine projections. The projections of the prism sheet 32 extend approximately parallel to the incidence surface 31A like the second embodiment.

Referring to FIG. 13, the running direction of the projection on the prism sheet 32 is indicated by a group of straight lines parallel to the incidence surface 31A and the running direction of the projection on the light guide plate 31 is indicated by a group of straight lines inclined at an angle θA relative to a vertical line to the incidence surface 31A.

If the inclination angle θA is too large, directivity of the irradiation light is affected. Therefore, the inclination angle θA is designed to be a small angle. Preferably, this angle is θA<10°. The existence of such obliquely running projections avoids deterioration of directivity and prevents formation of display moire fringes which might be caused due to cyclic structure of the liquid crystal display panel. Needless to say, this effect is more evident if the repeated formation pitch of the projection on the prism surface of the light guide plate 31 and prism sheet 32 is 100 μm or less, particularly 50 μm or less.

In the first to third embodiments described above, the emission surface (one diffusible surface) of the light guide plate provides a light control surface. However, like the fourth to sixth embodiments which will be described later, it is permissible that the back surface (other diffusible surface) of the light guide plate provides a light control surface.

In the aforementioned first to third embodiments, the light scattering guide plate made of the light scattering substance is used as the light guide plate. However, in the fourth to sixth embodiments which will be described next, a transparent light guide plate is used as the light guide plate.

In the description of the fourth to sixth embodiments, a repeated description of common matter to the first to third embodiments is omitted as possible. The same reference numerals will be used if possible.

(4) Fourth embodiment

Figure 14A:
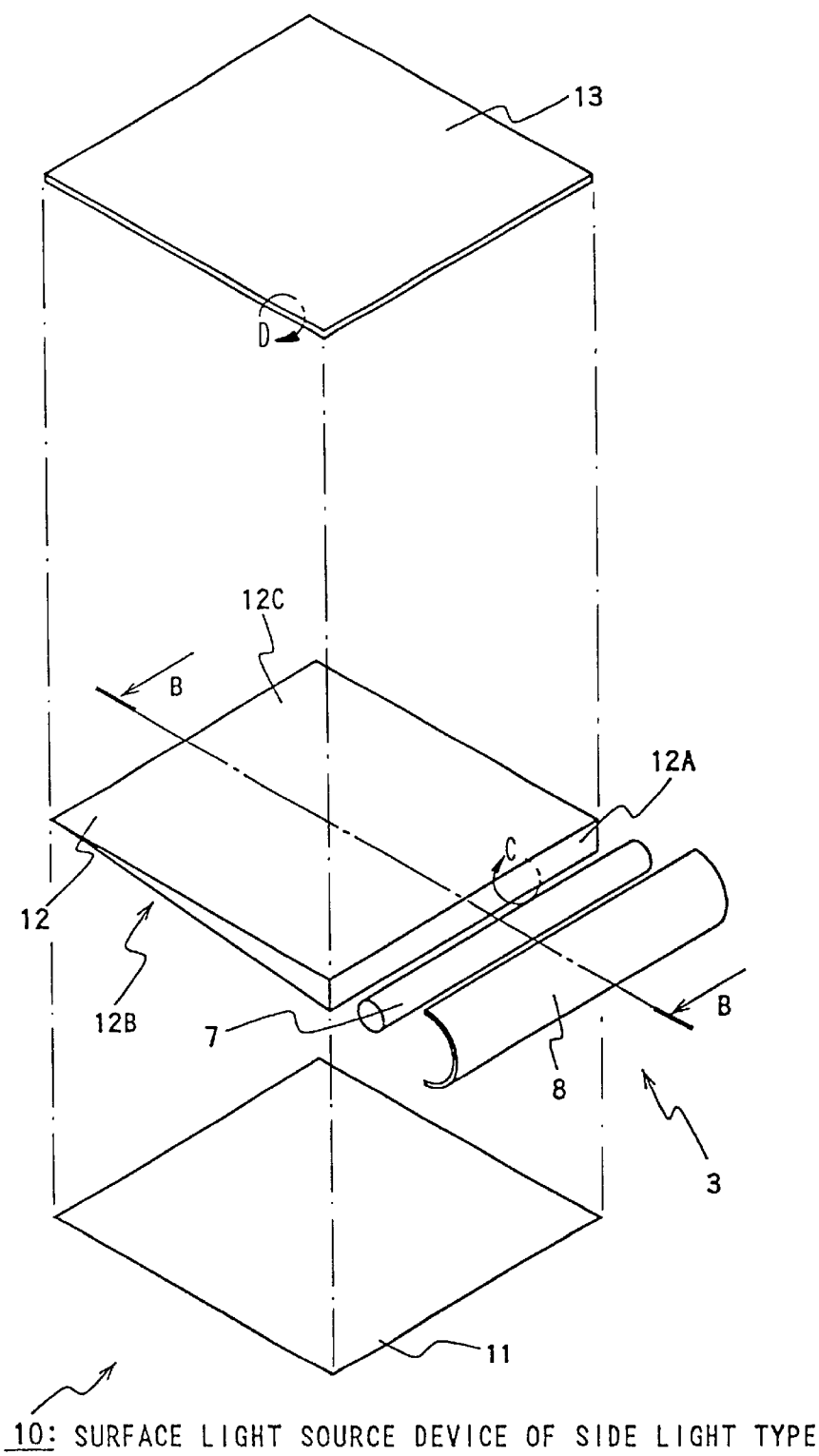
FIG. 14A is an exploded perspective view showing a surface light source of side light type according to the fourth embodiment of the present invention.
Figure 14B:
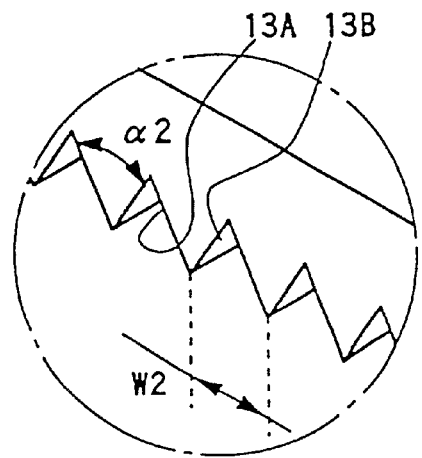
FIG. 14B is a partially enlarged view of a light control surface of a prism sheet, represented with arrow D in FIG. 14A.
Figure 14C:
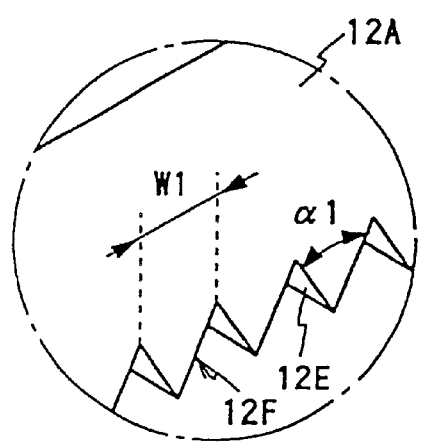
FIG. 14C is a partially enlarged view of a light control surface of a light scattering guide plate, represented with arrow C in FIG. 14A.
Figure 15:
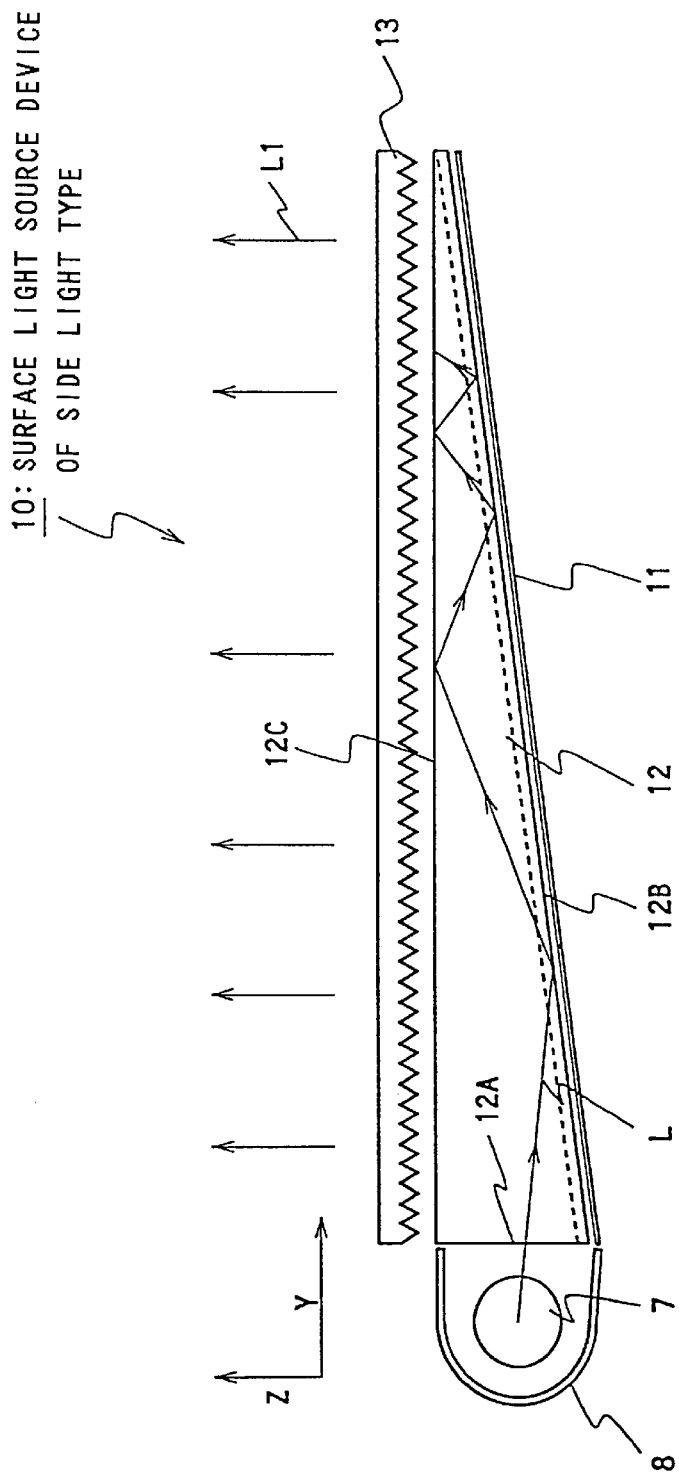
FIG. 15 is a sectional view taken along the line B—B of FIG. 14.

FIG. 14 is a disassembly perspective view showing a surface light source device of side light type according to the present invention. FIG. 15 is a sectional view taken along the line B—B of FIG. 14.

Referring to FIGS. 14 and 15, a surface light source device of side light type 10 comprises a light scattering guide plate 12, a primary light source 3, a reflection sheet 11 and a prism sheet 13 as a light control element. The reflection sheet 11, light scattering guide plate 12, and prism sheet 13 are laminatedly arranged. A regular reflection member on which silver is evaporated is used as the reflection sheet 11 to provide a high reflectivity for irradiation light. The reflection sheet 11 brings back irradiation light leaking from a back surface 12B of the light scattering guide plate 12 to inside of the light scattering guide plate 12 effectively so as to prevent loss of the irradiation light.

The light guide plate according to the present embodiment is a light guide plate 12 is made of, for example, acrylic resin, having a wedge-shaped section. A flat surface of the emission surface 12C of the light scattering guide plate 12 may be treated with mat processing over its entire area. The rough-surface treated emission surface 12C provides a light dispersion surface. As a result, the light scattering guide plate 12 transmits irradiation light by repeatedly reflecting between the back surface 12B and emission surface 12C while dispersing the irradiation light by the emission surface 12C. When the irradiation light is reflected by the back surface 12B and emission surface 12C, components having angle less than the critical angle are emitted from the back surface 12B and emission surface 12C.

The back surface 12B of the light scattering guide plate 12 provides a light control surface as shown by partial enlargement with an arrow C. This light control surface has a great number of fine projections running approximately perpendicular to the incidence surface 12A. A pair of slopes 12E, 12F are formed on each of the projections.

According to the present embodiment, the pair of the slopes 12E, 12F are directly joined with each other so that each projection has a triangle section. The pair of the slopes 12E, 12F have an equal angle relative to the normal provided on a general plane of the light scattering guide plate 12.

Its vertical angle α1 is, for example, about 60°. Generally, the vertical angle α1 of 50° to 130° is practical and preferably that angle is in a range of 60° to 110°.

The repeated pitch of the fine projection is preferred to be 100 μm or less, particularly 50 μm or less. This value corresponds to ½ or less (100 μm or less), or ¼ or less (50 μm or less) of picture element cycle of the liquid crystal display panel the back of which is irradiated by the surface light source device of side light type 10, so as to prevent an occurrence of moire fringes and further an occurrence of cyclic brightness unevenness.

The prism sheet 13 is the same as that employed for the first embodiment. As shown by partial enlargement with an arrow D, a prism surface is formed as a light control surface opposing the light guide plate 12. This prism surface has a great number of fine projections running approximately parallel to the incidence surface 12A. That is, the projections on the prism sheet 13 extend approximately perpendicular to the projections on the light guide plate 12.

Each of the projections on the prism sheet 13 has a pair of the slopes 13A, 13B. According to the present embodiment, the pair of the slopes 13A, 13B are directly joined to each other, so that each of the projections has a triangle-shaped section.

The pair of the slopes 13A, 13B form an equal angle relative to the normal set on a general plane of the light guide plate. The vertical angle α1 is, for example, about 66°. Generally, the vertical angle α2 of 30° to 70° is practical, preferably 50° to 70°, particularly preferably in a range of 60° to 70°.

The repeated pitch W2 of the fine projection on the prism sheet 13 is preferred to be 100 μm or less like W1, preferably 50 μm or less. This value corresponds to ½ or less (100 μm or less), or ¼ or less (50 μm or less) the picture element cycle of the liquid crystal display panel the back of which is irradiated by the surface light source device of side light type 10 so as to prevent an occurrence of moire fringes and an occurrence of cyclic fine brightness unevenness.

The irradiation light is emitted obliquely at an angle biased to the wedge distal end after it is scattered to some extent when it is emitted from the emission surface 12C. As already described with reference to FIG. 4, this irradiation light is introduced to the inside thereof through the slope 13A relatively near the incidence surface 12A and reflected by the slope 13B making a pair with the slope 13A so that the light is directed to the frontal direction of the emission surface 12C. Thus, the prism sheet 13 corrects directivity of the emission light to the frontal direction of the emission surface 12C in a plane perpendicular to the incidence surface 12A.

Figure 16:
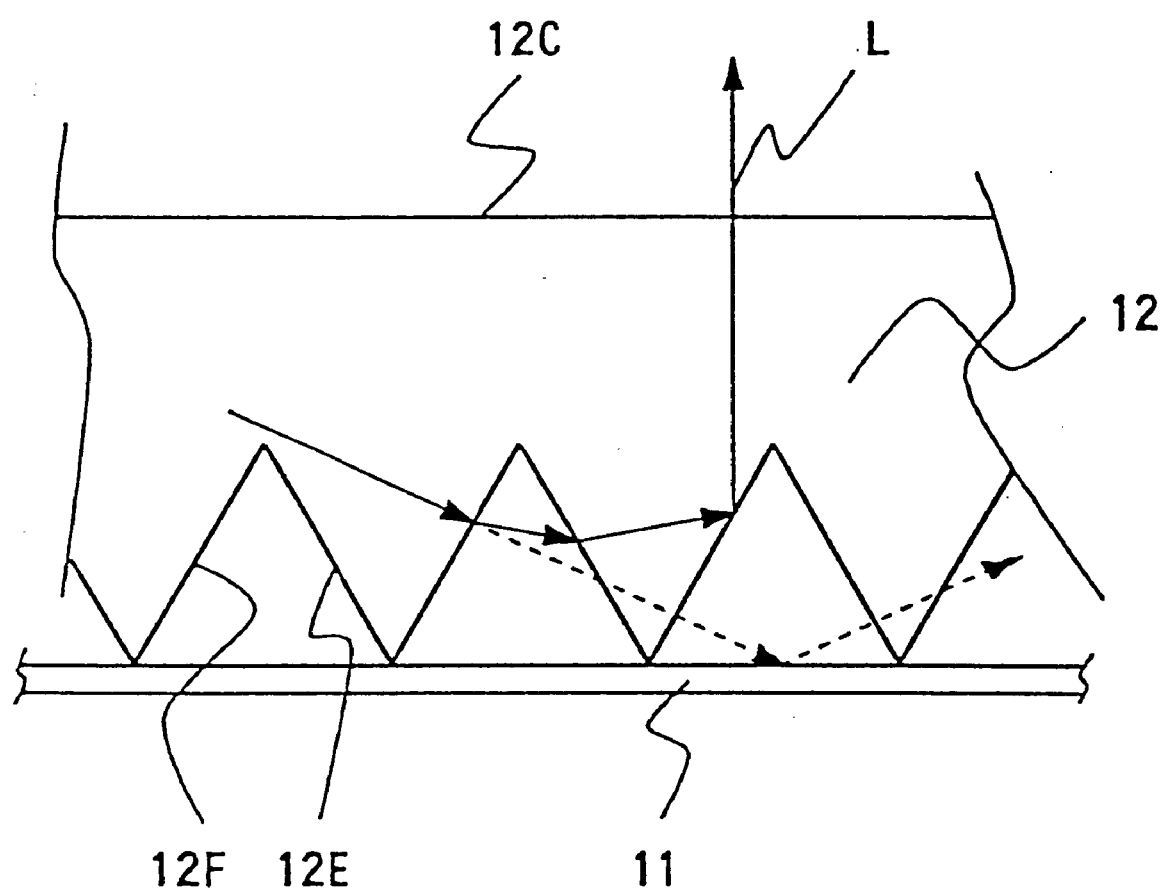
FIG. 16 is a sectional view showing the back face of the light guide plate of FIG. 14 is detail.

Using FIG. 16 for reference, the operation of the prism surface provided by the back surface 12B of the light scattering guide plate 12 will be considered. In the irradiation light entering the light guide plate 12, component going toward the back surface 12B is reflected by the slopes 12E, 12F. As a result, in a plane parallel to the incidence surface 12A, component directed to the frontal direction increases. Part of the irradiation light directed to the back surface 12B is emitted through the slope 12F out of the light guide plate 12 and then introduced again into the inside of the light guide plate 12 through the slope 12E. The introduced light is reflected by the adjacent slope 12F. As a result, in a plane parallel to the incidence surface 12A, component directed to the frontal direction is produced.

Therefore, as compared with a case in which the back surface 12B is a flat surface (see broken lines of FIG. 16), the light quantity directed to the frontal direction increases.

Figure 17:
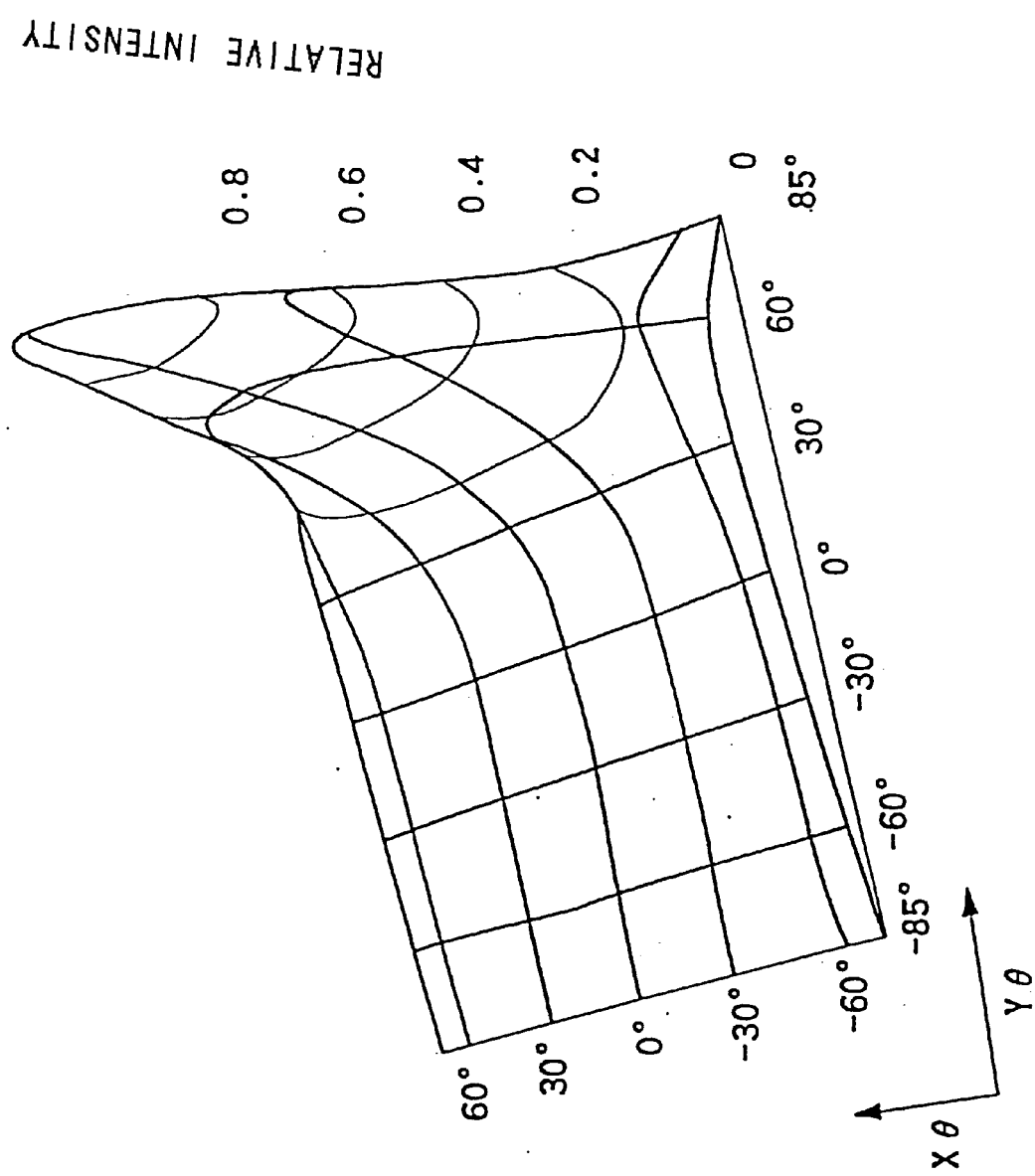
FIG. 17 is a graph showing a distribution of the irradiation light emitted from a conventional light guide plate, for comparison with the surface light source device of FIG. 14.

To recognize an advantage of combination of the prism surface on the back surface 12B and the prism surface on the prism sheet 13, a distribution of the irradiation light emitted from a transparent light guide plate having a flat back surface (without prism surface) and a rough-treated emission surface is shown in FIG. 17. As understood through FIG. 17, the distribution of the emission light from the light guide plate without the prism surface is inclined to the wedge distal end, in a plane perpendicular to the incidence surface and expanded to both sides in a plane parallel to the incidence surface.

Figure 18:
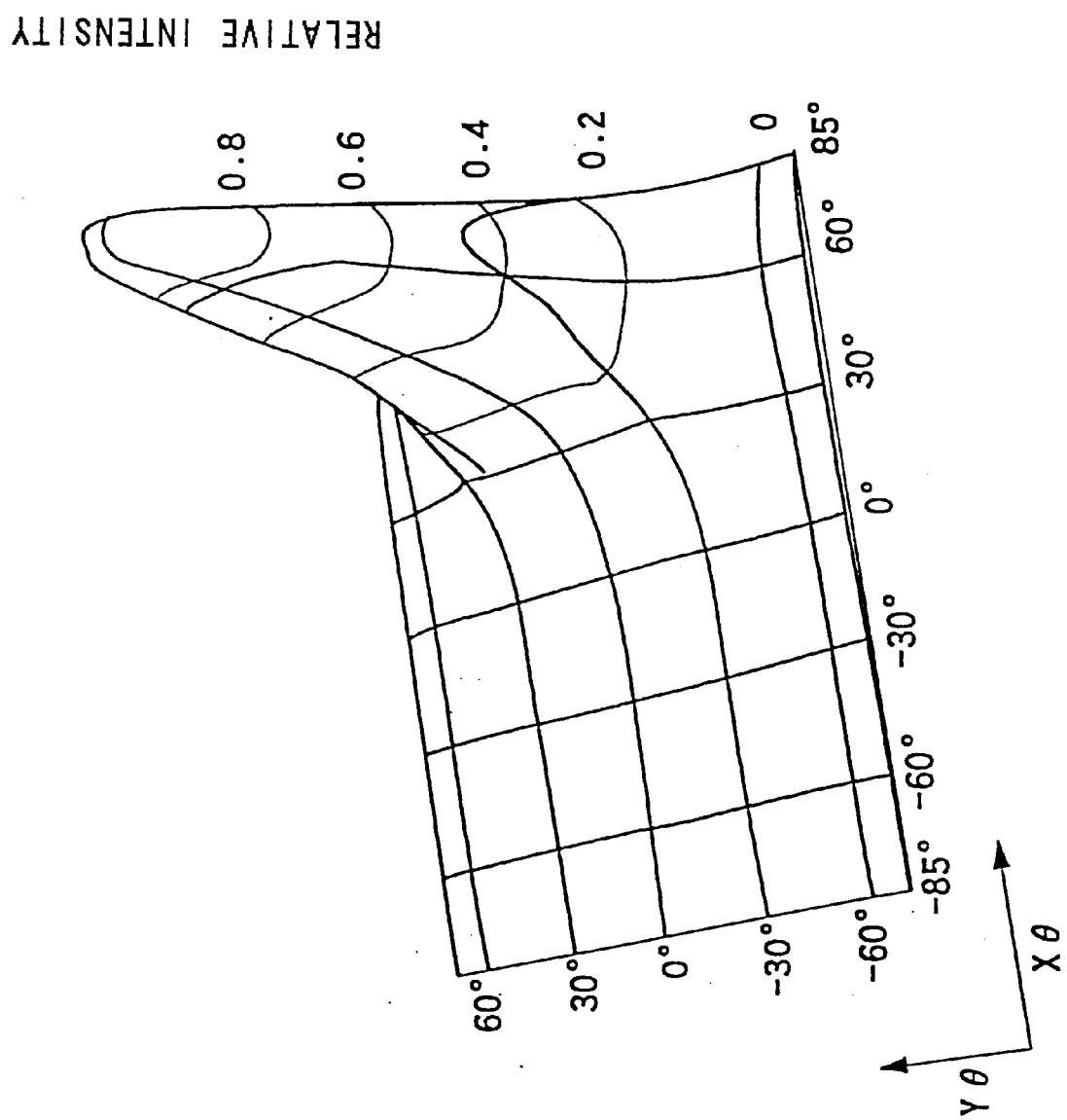
FIG. 18 is a graph showing a distribution of the irradiation light emitted from the surface light source device of FIG. 14.

On the contrary, FIG. 18 is a graph showing a distribution of the irradiation light emitted from the light guide plate 12 according to the present invention. As understood through FIG. 18, the distribution of the emission light according to the fourth embodiment is inclined to the wedge distal end, in a plane perpendicular to the incidence surface 12A. In a plane parallel to the incidence surface 12A, the expansion thereof to both sides is reduced. That is, the slopes 12E, 12F of the plural projections on the back surface 12B (see FIG. 16) correct a tendency that the irradiation light is emitted expandingly to both sides in a plane parallel to the incidence surface 12A.

As a result, in a plane parallel to the incidence surface 12A, the irradiation light in the frontal direction is effectively introduced. Thus, without the conventional prism sheet 6 (see FIGS. 21, 22), correction of directivity in a plane parallel to the incidence surface 12A is achieved.

What should be noticed is that because the irradiation light L is gathered in the frontal direction in a plane parallel to the incidence surface 12A, as compared with the conventional device (see FIGS. 21, 22), reflection (particularly, total reflection) on the slope 13A is unlikely. This improves the availability of the irradiation light.

The irradiation light subjected to correction of directivity in a plane parallel to the incidence surface 12A is subjected to directivity correction in a plane perpendicular to the incidence surface 12A by the prism sheet 13. Details of this operation is the same as described with reference to FIG. 4, therefore, the description will not be repeated.

Figure 19:
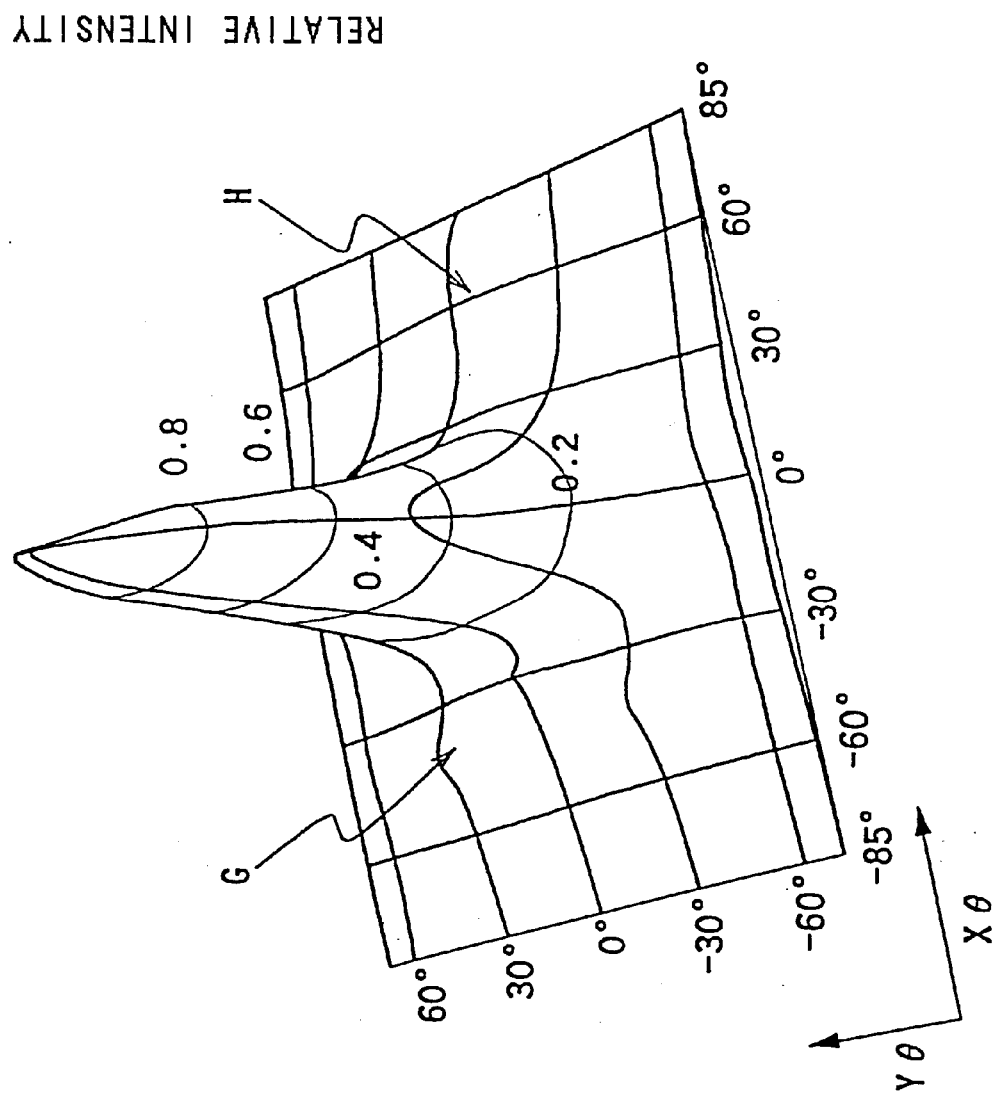
FIG. 19 is a graph showing a distribution of the irradiation light emitted from the prism sheet of the surface light source of FIG. 14.

FIG. 19 is a graph showing a distribution of the irradiation light emitted from the prism sheet 13 according to the present embodiment. FIG. 19 tells that directivity of the irradiation light L is corrected not only in a plane parallel to the incidence surface 12A but also in a plane perpendicular to the incidence surface 12A.

As described with reference to FIG. 7, a brightness peak is produced in other direction than the frontal direction of the emission surface 2C. This is estimated to be caused by a phenomenon that the component of the irradiation light reflected by the incidence surface of the prism sheet 5 is emitted in the other direction than the frontal direction of the emission surface 2C because it is reflected plural times between the prism sheet 5 and light guide plate 12.

(5) Fifth embodiment

The present embodiment has a common structure to the fourth embodiment except that the prism sheet 14 shown in FIG. 9 is employed instead of the prism sheet 13 (see FIGS. 14, 15) of symmetrical type. Thus, a repeated description of a common matter to the fourth embodiment will be simplified with reference to FIGS. 14, 15.

Like the fourth embodiment, the irradiation light emitted from the fluorescent lamp 7 is introduced into the inside of the light guide plate 12 through the incidence surface 12A directly or after reflected by the reflector 8. The irradiation light is transmitted in the inside of the light guide plate 12 by being repeatedly reflected between the back surface 12B and emission surface 12C while being dispersed by transparent fine particles.

Each time when reflected by the back surface 12B, an incidence angle relative to the emission surface 12C is decreased. Components having a smaller angle than the critical angle relative to the emission surface 12C are emitted from the emission surface 12C. The irradiation light leaking from the back surface 12B is returned back to the inside of the light guide plate 12 effectively by the reflection sheet 11 so as to prevent loss.

As described above, due to the operation of the prism surface (slopes 12E, 12F) formed as a light control surface on the back surface 12B, the emission light from the light guide plate 12 is gathered in the frontal direction, in a plane parallel to the incidence surface 12A.

The irradiation light L emitted from the light guide plate 12 passes the prism sheet 14 shown in FIG. 9 and irradiates, for example, the liquid crystal display panel. Directivity of the irradiation light L is corrected to the frontal direction by the slopes 13A, 13B parallel to the incidence surface 12A, in a plane perpendicular to the incidence surface 12A.

The prism sheet 14 has common structure and orientation as the prism sheet 13 except that the slopes 14A, 14B have different inclinations. The projections having the slopes 14A, 14B extend approximately parallel to the incidence surface 12A.

Referring to FIG. 9, the angle formed by the slope 14A relative to the normal set on a general plane of the light scattering guide plate 12 is expressed by $\beta1$ and the angle formed by the slope 14B is expressed by $\beta2$. The $\beta1$ is smaller than the $\beta2$.

The $\beta1$ and $\beta2$ are defined so that (i) main irradiation light emitted from the light guide plate 12 obliquely to the wedge distal end at an angle impinges upon the slope 14A relatively near the incidence surface 12A at a small incidence angle and then introduced to the slope 14B without any waste, and (ii) it is totally reflected by the slope 14B so that all thereof is directed to the frontal direction. A preferred combination is $\beta1=5.5°$ and $\beta2=35°$.

If the slopes 13A, 13B are provided with an equal inclination like the fourth embodiment, as shown in FIG. 10, there is a tendency that irradiation light component LA which is totally reflected by the slope 13A relatively near the incidence surface 12A and returned to the light guide plate 12 may be caused. Further, there is also produced a component LB which is not totally reflected by the slope 13B after introduced into the prism sheet 13 and directly emitted out of the prism sheet 13. Further, components which are repeatedly reflected by the projections formed repeatedly and emitted are also produced.

It is estimated that this phenomenon causes a peak like so-called side lobe toward main emission direction as shown by arrows G, H in FIG. 19.

Figure 20:
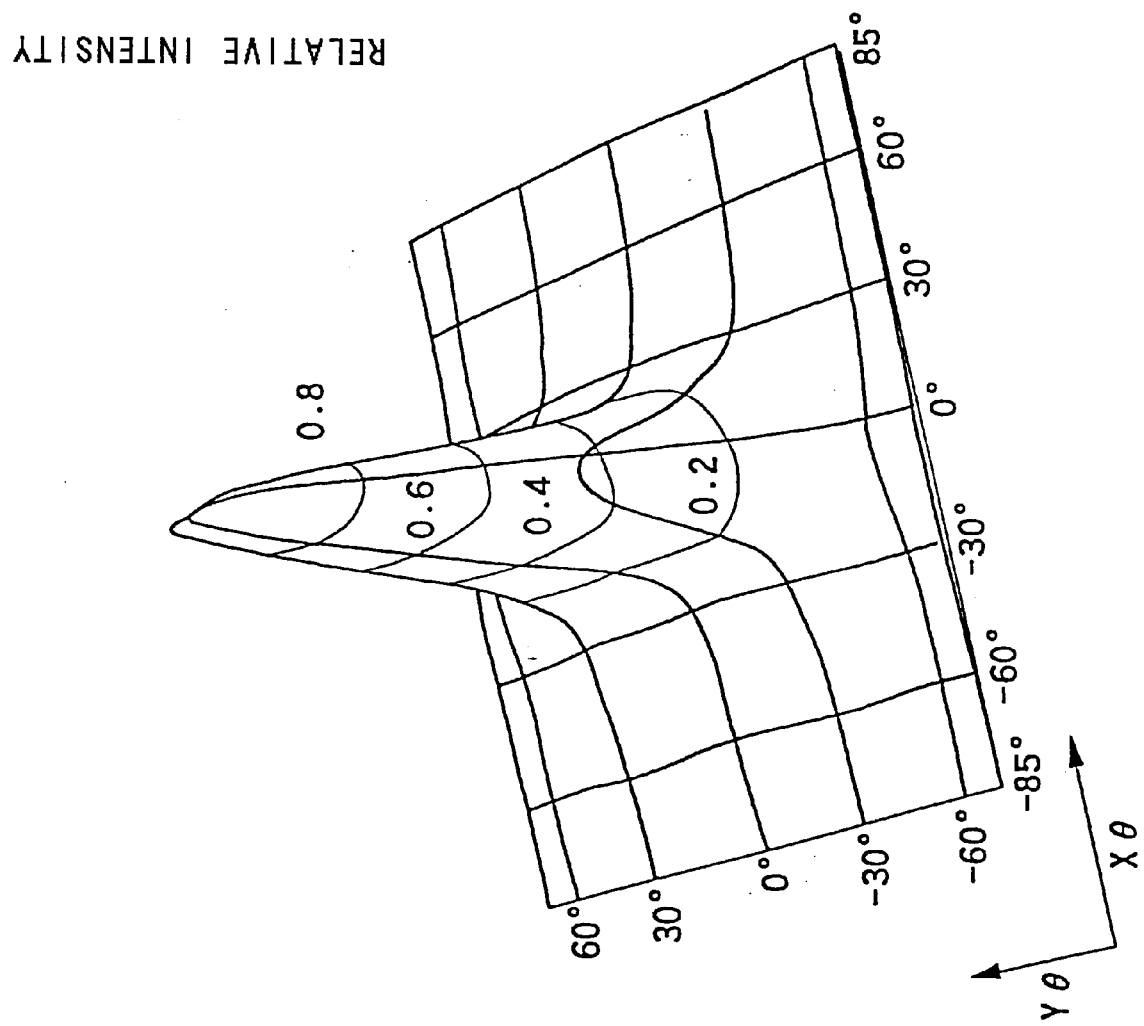
FIG. 20 is a graph showing directivity of the prism sheet employed in the fifth embodiment of the present invention.

To solve this problem, according to the present embodiment, this undesired peak is suppressed with $\beta1<\beta2$ ($\beta1$ is a small angle). FIG. 20 is a graph showing directivity under $\beta1=5.5°$ and $\beta2=35°$.

As understood through FIG. 20, according to the present embodiment, the irradiation light component emitted from the prism sheet directly at a large inclination like the component LB in FIG. 10 is suppressed.

The operation of gathering the irradiation light effectively to the frontal direction two-dimensionally is enhanced by a combination of the prism sheet and prism surface on the light guide plate 12.

What should be noticed here is that in the asymmetrical prism sheet shown in FIG. 9, when observed from the outside (liquid crystal display panel side), the slope 14B looks larger than the slope 14A. On the contrary, in the symmetrical prism sheet shown in FIG. 4, when observed from the outside (liquid crystal display panel side), the slope 13B looks to have the same area as the slope 13A.

Thus, accordingly to the second embodiment, as compared with the first embodiment, a pulsation of a fine emission intensity due to repetition of the fine projections of the prism sheet 14 is more effectively reduced so as to suppress moire fringes. Needless to say, this effect is more conceivable if the repeated formation pitch of the projection on the prism surface of the light guide plate 12 and prism sheet 14 is 100 $\mu$m or less, particularly 50 $\mu$m or less.

(6) Sixth embodiment

The present embodiment has a common structure to the third embodiment except that the prism surface of the light guide plate is formed on the back surface and the light guide plate is made of a transparent light guiding substance. The present embodiment will be described simply with reference to FIG. 13.

Referring to FIG. 13, the irradiation light emitted from the fluorescent lamp 7 is introduced into the inside of the light guide plate 31 directly from the incidence surface 31A or after reflected by the reflector 8. The irradiation light is transmitted inside of the light guide plate by being repeatedly reflected between the back surface and emission surface.

Each time when reflected by the back surface, an incidence angle relative to the emission surface drops. Components having a smaller angle than the critical angle relative to the emission surface are emitted from the emission surface. The irradiation light leaking from the back surface is brought back to the inside of the light guide plate 31 effectively by the reflection sheet (not shown) so as to prevent loss. The irradiation light emitted from the light guide plate 31 passes the prism sheet 32 and is emitted approximately to the frontal direction thereby irradiating, for example, the liquid crystal display panel. The prism sheet 32 may be symmetrical (see FIG. 4) or asymmetrical (see FIG. 9).

The emission surface of the light guide plate 31 may be treated with rough surface processing to be provided with some extent of scattering property. A prism surface is formed on the back surface of the light guide plate 31. This prism surface is formed by repeated arrangement of the projection having a triangle section. A feature of the present embodiment is that the running direction of this projections is inclined intentionally at an angle θA relation to a direction perpendicular to the incidence surface 31A.

The prism surface opposing the light guide plate 31 of the prism sheet 32 has a great number of fine projections. The projections of the prism sheet 32 extend approximately parallel to the incidence surface 31A like the second embodiment.

Referring to FIG. 13, the running direction of the projection on the prism sheet 32 is expressed by a group of straight lines parallel to the incidence surface 31A and the running direction of the projections on the back surface of the light guide plate 31 is expressed by a group of straight lines inclined at an angle θA relative to a vertical line relative to the incidence surface 31A.

If the inclination angle θA is too large, directivity of the irradiation light is affected. Then, the inclination angle θA is designed to be a small angle. Preferably it is θA<10°. Such obliquely running projections avoid a deterioration of directivity and at the same time, effectively prevent display moire fringes which might be caused depending on a relation with the cyclic structure of the liquid crystal display panel. Needless to say, this effect is more conceivable if the repeated formation pitch of the projection of the prism surface on the light guide plate 31 and prism sheet 32 is 100 μm or less, particularly 50 μm or less.

(7) Seventh embodiment

In the third embodiment or sixth embodiment, it is permissible to incline the running direction of the projection on the prism sheet acting as a light control member instead of inclining the running direction of the projection on the light guide plate. In a case when a light control member having such a structure is employed, that case corresponds to situation where reference numeral 31 is regarded as the prism sheet and reference numeral 32 is regarded as the light guide plate in FIG. 13. Here, the running direction of the lamp 7 is assumed to be parallel to an end face of the light guide plate indicated by reference numeral 32.

Even if the third embodiment or sixth embodiment is modified in this way, their optical operation is not changed. Thus, the detailed description thereof will not be repeated. In the present embodiment also, the advantage can be obtained like the third embodiment or sixth embodiment.

(8) Other modifications

The first to seventh embodiments described above do not restrict the present invention. For example, following modifications are possible.

(a) The repetition pitch of the projection on the light guide plate and light control member may be selected on design. Generally, it is preferable that this pitch is smaller than the pitch of the cyclic fine structure of the liquid crystal display panel to prevent from occurring moire fringes.

(b) The running direction of the projection on the light guide plate and light control member may be deviated at a fine angle from orthogonal relation. For example, it is permissible to incline the light control member at a range of 10° or less relative to the incidence surface of the light guide plate such that the running direction of the projection on the light control member and running direction of the projection on the light guide plate may be deviated in a range of 10° or less.

(c) Sectional shape of each projection on the light guide plate and light control member is not restricted to triangle shape. For example, it is permissible to form a pair of slopes with flat surfaces, smooth curves or the like. Further, it is permissible to join the adjacent projections with each other.

(d) The member and production method of the prism sheet employed as the light control member are not restricted to particular ones. For example, it is permissible to use light guiding member such as ones made of polycarbonate (PC), poly methyl methacrylate (PMMA) or the like. Further it is permissible to use sheet-like or plate-like light control member having no flexibility instead of prism sheets made of resin member having a flexibility.

(e) It is permissible to dispose the light diffusing sheet between the light control member and light guide plate, outside of the light control member or on the prism sheet. Further, it is permissible to form a light scattering surface on an outside face (an irradiation light emission surface) of the prism sheet.

(f) It is permissible to use a regular reflection member of an optional member or an irregular reflection member such as white PET or the like as the reflection member.

(g) In the first embodiment to third embodiment, the light scattering guide plate is employed as light guide plate and in the fourth embodiment to sixth embodiment, the transparent light guide plate is employed as the light guide plate.

However, the light scattering guide plate according to the first embodiment to third embodiment may be replaced with the transparent light guide plate. The transparent light guide plate according to the fourth embodiment to sixth embodiment may be replaced with the light scattering guide plate.

(h) The sectional shape of the light guide plate may not be of wedge shape. For example, a light guide plate having an equal thickness may be employed.

(i) The incidence surface of the light guide plate may be provided on two or more end faces. It is permissible to provide a great number of primary light sources corresponding thereto.

(j) The primary light source may be provided with a light source element other than the rod-like light source, such as the fluorescent lamp. For example, it is permissible to dispose a plurality of point light sources like light emission diode or the like so as to form a primary light source.

(k) The surface light source of the present invention may be applied to other applications than the back lighting for the liquid crystal display device. For example, it can be widely applied to various lighting appliance and displays.

What is claimed is:

1. A surface light source device of side light type comprising: a light guide plate having two major surfaces providing an emission surface and a back surface; a primary light source for supplying irradiation light from an end face of said light guide plate; and a light control member which is disposed along said emission surface for correcting directivity of the irradiation light emitted from said emission surface, at least one of said two major surfaces providing a first light control surface in which projections running approximately perpendicular to said end face are repeatedly disposed, a surface, facing said light guide plate, of said light control member providing a second light control surface in which projections running approximately parallel to said end face are repeatedly disposed.

2. A surface light source device of side light type comprising: a light guide plate having two major surfaces providing an emission surface and a back surface; a primary light source for supplying irradiation light from an end face of said light guide plate; and a light control member which is disposed along said emission surface for correcting directivity of the irradiation light emitted from said emission surface, said emission surface providing a first light control surface in which projections running approximately perpendicular to said end face are repeatedly disposed, a surface, facing said light guide plate, of said light control member providing a second light control surface in which projections running approximately parallel to said end face are repeatedly disposed.

3. A surface light source device of side light type according to claim 2 wherein the projections of said first light control surface and said second light control surface are arranged at repetition pitch of 100 μm or less.

4. A surface light source of side light type according to claim 2 or 3 wherein a pair of slopes formed on each projection of said second light control surface provides a first slope relatively near said end face and a second slope relatively far from said end face and an inclination angle of said first slope relative to the normal set on a general plane of said light guide plate is smaller than the inclination angle of said second slope relative to said normal.

5. A surface light source of side light type according to claim 4 wherein the inclination angle of said first slope is set so as to introduce main irradiation light emitted from said emission surface to said second slope and the inclination angle of said second slope is set so as to totally reflect the irradiation light arriving from said first slope to be directed in the direction of said normal.

6. A surface light source of side light type according to claim 2 or 3 wherein a running direction of the projection of said second light control surface is inclined by a small angle not exceeding 10° relative to said end face, the direction of repeated arrangement of the projection of said first light control surface being inclined by a small angle not exceeding 10° relative to the running direction of the projection of said second light control surface.

7. A surface light source of side light type according to claim 4 wherein an running direction of the projection of said second light control surface is inclined by a small angle not exceeding 10° relative to said end face, the direction of repeated arrangement of the projection of said first light control surface being inclined by a small angle not exceeding 10° relative to the running direction of the projection of said second light control surface.

8. A surface light source of side light type according to claim 2 or 3 wherein the running direction of the projection of said second light control surface is inclined by a small angle not exceeding 10° relative to said end face, the running direction of the projection of said first light control surface being perpendicular to the running direction of the projection of said second light control surface.

9. A surface light source of side light type according to claim 4 wherein the running direction of the projection of said second light control surface is inclined by a small angle not exceeding 10° relative to said end face, the running direction of the projection of said first light control surface being perpendicular to the running direction of the projection of said second light control surface.

10. A surface light source of side light type according to claim 7 wherein the running direction of the projection of said second light control surface is inclined by a small angle not exceeding 10° relative to said end face, the running direction of the projection of said first light control surface being perpendicular to the running direction of the projection of said second light control surface.

11. A surface light source of side light type according to claim 2 or 3 wherein said first light control surface is defined so that the pair of the slopes formed on each projection provides an angle in a range of 50° to 130°.

12. A surface light source of side light type according to claim 4 wherein said first light control surface is defined so that the pair of the slopes formed on each projection provides an angle in a range of 50° to 130°.

13. A surface light source of side light type according to claim 6 wherein said first light control surface is defined so that the pair of the slopes formed on each projection provides an angle in a range of 50° to 130°.

14. A surface light source of side light type according to claim 8 wherein said first light control surface is defined so that the pair of the slopes formed on each projection provides an angle in a range of 50° to 130°.

15. A surface light source of side light type according to claim 13 wherein a regular reflection layer for reflecting irradiation light regularly is disposed on said back surface of said light guide plate.

16. A surface light source of side light type according to claim 4 wherein a regular reflection layer for reflecting irradiation light regularly is disposed on said back surface of said light guide plate.

17. A surface light source of side light type according to claim 6 wherein a regular reflection layer for reflecting irradiation light regularly is disposed on said back surface of said light guide plate.

18. A surface light source of side light type according to claim 8 wherein a regular reflection layer for reflecting irradiation light regularly is disposed on said back surface of said light guide plate.

19. A surface light source of side light type according to claim 11 wherein a regular reflection layer for reflecting irradiation light regularly is disposed on said back surface of said light guide plate.

20. A surface light source device of side light type comprising: a light guide plate having two major surfaces providing an emission surface and a back surface; a primary light source for supplying irradiation light from an end face of said light guide plate; and a light control member which is disposed along said emission surface for correcting directivity of the irradiation light emitted from said emission surface, said back surface providing a first light control surface in which projections running approximately perpendicular to said end face are repeatedly disposed, a surface, facing said light guide plate, of said light control member providing a second light control surface in which projections running approximately parallel to said end face are repeatedly disposed.

21. A surface light source device of side light type according to claim 20 wherein the projections of said first light control surface and said second light control surface are arranged at repetition pitch of 100 μm or less.

22. A surface light source of side light type according to claim 20 or 21 wherein a pair of slopes formed on each projection of said second light control surface provides a first slope relatively near said end face and a second slope relatively far from said end face and an inclination angle of said first slope relative to the normal set on a general plane of said light guide plate is smaller than the inclination angle of said second slope relative to said normal.

23. A surface light source of side light type according to claim 22 wherein the inclination angle of said first slope is set so as to introduce main irradiation light emitted from said emission surface to said second slope and the inclination angle of said second slope is set so as to totally reflect the irradiation light arriving from said first slope to be directed in the direction of said normal.

24. A surface light source of side light type according to claim 20 or 21 wherein a running direction of the projection of said second light control surface is inclined by a small angle not exceeding 10° relative to said end face, the direction of repeated arrangement of the projection of said first light control surface being inclined by a small angle not exceeding 10° relative to the running direction of the projection of said second light control surface.

25. A surface light source of side light type according to claim 22 wherein an running direction of the projection of said second light control surface is inclined by a small angle not exceeding 10° relative to said end face, the direction of repeated arrangement of the projection of said first light control surface being inclined by a small angle not exceeding 10° relative to the running direction of the projection of said second light control surface.

26. A surface light source of side light type according to claim 20 or 21 wherein the running direction of the projection of said second light control surface is inclined by a small angle not exceeding 10° relative to said end face, the running direction of the projection of said first light control surface being perpendicular to the running direction of the projection of said second light control surface.

27. A surface light source of side light type according to claim 22 wherein the running direction of the projection of said second light control surface is inclined by a small angle not exceeding 10° relative to said end face, the running direction of the projection of said first light control surface being perpendicular to the running direction of the projection of said second light control surface.

28. A surface light source of side light type according to claim 20 or 21 wherein said first light control surface is defined so that the pair of the slopes formed on each projection provides an angle in a range of 50° to 130°.

29. A surface light source of side light type according to claim 22 wherein said first light control surface is defined so that the pair of the slopes formed on each projection provides an angle in a range of 50° to 130°.

30. A surface light source of side light type according to claim 24 wherein said first light control surface is defined so that the pair of the slopes formed on each projection provides an angle in a range of 50° to 130°.

31. A surface light source of side light type according to claim 26 wherein said first light control surface is defined so that the pair of the slopes formed on each projection provides an angle in a range or 50° to 130°.

32. A sheet-like light control member containing a prism surface, said prism surface having a great number of projections repeatedly arranged, each of said projections running in a direction inclined at an acute angle relative to an end face of said light control member and having a pair of slopes including a first slope and a second slope, said first slope and second slope being inclined relative to a general plane along said light control member.

* * * * *

UNITED STATES PATENT AND TRADEMARK OFFICE
CERTIFICATE OF CORRECTION

PATENT NO. : 6,328,453 B1  Page 1 of 1
DATED : December 11, 2001
INVENTOR(S) : Shingo Ohkawa It is certified that error appears in the above-identified patent and that said Letters Patent is hereby corrected as shown below:

Title page,
Item [73], Assignee, insert -- Yasuhiro Koike, Yokohama, Japan --.

Column 5,
Line 2, before "detail", delete "is".
Line 64, change "60 1" to -- $\alpha 1$ --.

Column 16,
Line 55, before "disposed" insert -- separated from said light guide plate and --.

Column 17,
Line 4, before "disposed" insert -- separated from said light guide plate and --.

Column 18,
Line 50, before "disposed" insert -- separated from said light guide plate and --.

Signed and Sealed this

Twenty-sixth Day of November, 2002

Attest:

JAMES E. ROGAN
Attesting Officer
Director of the United States Patent and Trademark Office